United States Patent
Girgensohn et al.

(10) Patent No.: US 7,623,677 B2
(45) Date of Patent: Nov. 24, 2009

(54) METHODS AND INTERFACES FOR VISUALIZING ACTIVITY ACROSS VIDEO FRAMES IN AN ACTION KEYFRAME

(75) Inventors: Andreas Girgensohn, Palo Alto, CA (US); Frank M. Shipman, College Station, TX (US); Lynn Wilcox, Palo Alto, CA (US); Donald G. Kimber, Foster City, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 746 days.

(21) Appl. No.: 11/324,355

(22) Filed: Jan. 3, 2006

(65) Prior Publication Data
US 2006/0284976 A1 Dec. 21, 2006

Related U.S. Application Data

(60) Provisional application No. 60/691,830, filed on Jun. 17, 2005, provisional application No. 60/691,983, filed on Jun. 17, 2005, provisional application No. 60/691,899, filed on Jun. 17, 2005.

(51) Int. Cl.
*G06K 9/00* (2006.01)
*H04N 7/18* (2006.01)
*H04N 5/14* (2006.01)

(52) U.S. Cl. .................. 382/103; 348/135; 348/701
(58) Field of Classification Search .................. 382/103, 382/107, 225; 348/135, 701, 430.1, 456, 348/490; 345/440, 546, 951; 704/236, 255, 704/270; 707/2, 3, 4, 104.1; 715/719, 839
See application file for complete search history.

(56) References Cited

U.S. PATENT DOCUMENTS

| 5,136,655 | A | 8/1992 | Bronson |
| 5,655,058 | A | 8/1997 | Balasubramanian et al. |
| 5,680,558 | A | 10/1997 | Hatanaka et al. |
| 5,708,767 | A | 1/1998 | Yeo et al. |
| 6,366,296 | B1 | 4/2002 | Boreczky et al. |
| 6,535,639 | B1* | 3/2003 | Uchihachi et al. ............ 382/225 |
| 6,573,940 | B1* | 6/2003 | Yang .......................... 348/441 |
| 6,807,361 | B1* | 10/2004 | Girgensohn et al. .......... 386/52 |
| 7,143,083 | B2* | 11/2006 | Carlbom et al. ................ 707/3 |
| 7,221,366 | B2* | 5/2007 | Uyttendaele et al. ......... 345/427 |
| 2003/0044045 | A1* | 3/2003 | Schoepflin et al. .......... 382/103 |

(Continued)

OTHER PUBLICATIONS

Boreczky, J., et al., "An Interactive Comic Book Presentation for Exploring Video," FX Palo Alto Laboratory, Inc. (1999).

(Continued)

*Primary Examiner*—Abolfazl Tabatabai
(74) *Attorney, Agent, or Firm*—Morgan, Lewis & Bockius LLP

(57) ABSTRACT

Techniques for generating action keyframes for a fixed-position camera based on the identification of activity in the video, an assessment of the importance of the activity, object recognition in the video, and interaction techniques for seeing more details of the video are presented. In different embodiments of the invention, the importance of activity is determined based on the amount of activity, important locations in the video streams, detected features such as faces, and events from other sensors.

26 Claims, 21 Drawing Sheets

U.S. PATENT DOCUMENTS

| | | | |
|---|---|---|---|
| 2003/0161396 | A1 | 8/2003 | Foote et al. |
| 2003/0189588 | A1 | 10/2003 | Girgensohn et al. |
| 2003/0197731 | A1 | 10/2003 | Chiu et al. |

OTHER PUBLICATIONS

Cheung, S., et al., "Robust Techniques for Background Subtraction in Urban Traffic Video," Center for Applied Scientific Computing (2004).

Girgensohn A., et al., "A Semi-Automatic Approach to Home Video Editing." In Proceedings of UIST '00, ACM Press, pp. 81-89 (2000).

Plaisant, C., et al., "Lifelines: Visualizing Personal Histories," University of Maryland, http://www.cs.umd.edu/projects/hcil (at least as early as Jun. 14, 2005).

Wildemuth, B., "How Fast is Too Fast? Evaluating Fast Forward Surrogates for Digital Video," Interaction Design Laboratory, Proceedings of the 3rd ACM/IEEE-CS Joint Conference on Digital Libraries, University of North Carolina at Chapel Hill, pp. 221-230 (2003).

Zivkovic, Z., "Improved Adaptive Gaussian Mixture Model for Background Subtraction," Intelligent and Autonomous Systems Group, University of Amsterdam, The Netherlands (2004).

Kumar V., et al., "Metadata Visualization for Digital Libraries: Interactive Timeline Editing and Review." Proceedings of the 3rd ACM Conference on Digital Libraries, pp. 126-133 (1998).

Yeung, M., et al., "Video Visualization for Compact Presentation and Fast Browsing of Pictorial Content," IEEE Trans. Circuits and Sys. For Video Tech., vol. 7, No. 5 pp. 771-785 (Oct. 1997).

Demirdjian et al., "Activity Maps for Location-Aware Computing," In Proceedings of IEEE Workshop on Applications of Computer Vision (WACV2002), Orlando, Florida (Dec. 2002).

Larson et al., "An exploratory look at supermarket shopping paths," The Wharton School, The University of Pennsylvania, Philadelphia, http://www.searchlores.org/realicra/PT 1006.pdf (Dec. 9, 2005).

Pingali et al., "Multimedia Retrieval through Spatio-Temporal Activity Maps," Proceedings of the ACM Multimedia, pp. 129-136, Ottawa (Sep. 2001).

Porikli, F., "Multi-Camera Surveillance: Object-Based Summarization Approach," Mitsubishi Electric Research Laboratories, Inc., https://www.merl.com/reports/docs/TR2003-145.pdf (Mar. 2004).

Santini, S., "Analysis of traffic flow in urban areas using web cameras" Fifth IEEE Workshop on Applications of Computer Vision (WACV 2000) Palms Spring, CA (Dec. 2000).

Stauffer and Grimson, "Learning Patterns of Activity Using Real-Time Tracking, " IEEE Trans. Pattern Anal. Mach. Intell. 22(8): 747-757 (2000), http://people.csail.mit.edu/welg/papers/learning2000.pdf.

Xiang and Gong, "Activity based video content trajectory representation and segmentation," In Proc. British Machine Vision Conference (BMVC), pp. 177-186, Kingston, U.K. (Sep. 2004), http://www.dcs.qmul.ac.uk/~txiang/xiang_gong_ bmvc04_segment_camera_ready.pdf.

"Tag Team: Tracking the Patterns of Supermarket Shoppers," Knowledge@Wharton, The Wharton School of the University of Pennsylvania (Jun. 1, 2005), http://knowledge.wharton.upenn.edu/articlepdf/1208.pdf?CFID=36967030&CFTOKEN=41348498&jsessionid=9a3085e52c58255c797c.

Topic 6, "Analyxing InStore Shopping Patterns," Map Analysis, http://www.innovativegis.com/basis/MapAnalysis/Topic6/Topic6.pdf (accessed Sep. 11, 2007).

\* cited by examiner

METHODS AND INTERFACES FOR VISUALIZING ACTIVITY ACROSS VIDEO FRAMES IN AN ACTION KEYFRAME

PRIORITY CLAIM

This application claims priority under 35 U.S.C. 119(e) to U.S. Provisional Application No. 60/691,830, filed Jun. 17, 2005, entitled METHODS AND INTERFACES FOR EVENT TIMELINES AND LOGS OF VIDEO STREAMS, and to U.S. Provisional Application No. 60/691,983, filed Jun. 17, 2005, entitled METHODS AND INTERFACES FOR VISUALIZING ACTIVITY ACROSS VIDEO FRAMES IN AN ACTION KEYFRAME, and to U.S. Provisional Application No. 60/691,899, filed Jun. 17, 2005, entitled METHOD AND SYSTEM FOR ANALYZING FIXED-CAMERA VIDEO VIA THE SELECTION, VISUALIZATION, AND INTERACTION WITH STORYBOARD KEYFRAMES, each of which is incorporated herein by reference.

CROSS REFERENCE TO RELATED APPLICATIONS

This application is related to the following applications, which were filed of even date herewith:

(1) "Method and System for Analyzing Fixed-Camera Video via the Selection, Visualization, and Interaction with Storyboard Keyframes," by Andreas Girgensohn, et al. Ser. No. 11/324,557, and (2) "Methods and Interfaces for Event Timelines and Logs of Synchronized Video Streams" by Andreas Girgensohn, et al. Ser. No. 11/324,971.

FIELD OF THE INVENTION

Techniques for generating action keyframes for a fixed-position camera based on the identification of activity in the video, an assessment of the importance of the activity, object recognition in the video, and interaction techniques for seeing more details of the video are presented.

BACKGROUND OF THE INVENTION

Description of the Related Art

There are many situations where a user needs to get a sense of activity in a video segment. Security personnel do so when determining if a video segment is of interest. Users of video libraries do so when they are determining if a video segment meets their needs. Many interfaces rely on playing video segments at high speed (see Wildemuth B. M., Marchionini G., Yang M., Geisler G., Wilkens T., Hughes A., Gruss R. How Fast is too Fast?: Evaluating Fast Forward Surrogates for Digital Video. Proceedings of the 3rd ACM/IEEE-CS Joint Conference on Digital libraries, pp. 221-230, 2003), showing a sequence of keyframes U.S. Pat. No. 6,535,639, or having different video frames appear as the user scrubs over a timeline.

Due to limitations in bandwidth and the ability to assess multiple video segments simultaneously, interfaces other than playing video are needed for presenting activity in a video segment. One could naively expect that moving objects can be shown by periodically sampling frames in the video and by creating a single image by averaging the pixels of the video frames. This is the approach used in strobe photography where a strobe light periodically makes an otherwise dark object visible so that it is captured by a camera with a very long exposure. However, this approach only works because the background is dark. A bright background dominates in such a combined frame, and foreground objects are only faintly visible.

Activity is determined based on the removal of the background from frames of video to determine the location and size of moving objects.

The simplest approach is to compare subsequent frames and to use all changed pixels as foreground pixels. However, this approach can only determine the leading and trailing edges of objects in motion. Objects at rest cannot be found with this approach. Also, this approach is very susceptible to video noise.

Another approach is to maintain a time stamp for each pixel position that indicates the last time that pixel was changed compared to the previous frame. Areas with similar time stamps can be grouped into shapes. Video noise can be addressed by requiring minimum sizes for shapes. This approach can also be used for object tracking. Objects at rest can be found assuming that they moved to their current position at some point in the past.

A third approach determines the median value for each pixel in a sequence of video frames. Values close to the median should be considered to be part of the background. Determining the median of all frames before separating foreground and background requires a second pass. Only considering video frames earlier than the current frame for determining the background can avoid this second pass at the expense of some accuracy. To avoid having to store all previous pixel values in memory, the median can be determined by computing a histogram of all historic values for each pixel position and by computing the median from the histogram. If only the recent history should be considered for determining the median, a buffer window approach can be used that either determines the median from the buffer window or removes values from the histogram as they slide out of the window. However, for longer intervals such an approach would use prohibitively large amounts of memory. Instead, a histogram with an exponential decay factor can be used where older values have a lower weight than newer ones. The median value approach deals very well with video noise but has problems with sudden or gradual shifts in lighting conditions. Clustering techniques can be applied to find intervals with similar lighting conditions. Histograms are also suitable in situations where several steady states exist and a foreground pixel would be anything that does not fall into one of those states. An example is a flickering light where all its states would be part of the background but an object passing in front of it should be recognized.

In general, there are many approaches for separating foreground and background pixels. Several researchers have applied Gaussian mixture models to this problem (see in Chueng, S.-C. S. and Kamath C. Robust Techniques for Background Subtraction in Urban Traffic Video. Video Communications and Image Processing, SPIE Electronic Imaging, San Jose, 2004; Zivkovic, Z. Improved adaptive Gaussian mixture model for background subtraction. International Conference Pattern Recognition, 2004). Most of these approaches can be applied to grayscale images. The consideration of color information increases the computational complexity without significantly improving the performance. The threshold for considering a pixel to be different from the background or a pixel in another frame determines the sensitivity to change and to video noise. The threshold also determines whether shadows and reflections are considered to be part of the foreground. However, different thresholds might work better in different lighting conditions. More sophisticated approaches might be needed to be able to ignore a flickering light.

We previously proposed a different approach for visualizing movement in a video sequence in a single keyframe U.S. patent application Ser. No. 10/116,012, Publication Number 20030189588. While in U.S. patent application Ser. No. 10/116,012 the trajectory lines use color-coding to indicate temporal relationship, there are a number of features that were not performed including foreground-background separation or object detection and tracking. Rather, U.S. patent application Ser. No. 10/116,012 determined pixels that changed between sampled frames and visualized the changed pixels by putting translucent color on top of a single keyframe from that video sequence. The color and transparency of the color overlays varied with the temporal distance of the sample frames from the keyframe. Only pixels from a single frame were shown with changes from other frames overlaid solely as colored dots.

SUMMARY OF THE INVENTION

This invention involves a method for presenting activity in a video segment for a fixed-position camera via a single still image. The background (or non-moving objects) are first separated from the foreground (or moving objects). The sample rate of the frames determines how distinctly the foreground objects are perceived. Sample rates where moving objects do not overlap from one frame to the next work best. For normal security camera placements and people walking perpendicular to the camera view, sample rates between 0.5 and 2 frames per second are preferred.

For creating a single still image from the sampled video frames, translucent images of moving objects from video frames are combined with the average background of the video sequence. The translucence of the overlays can be varied based on the perceived importance of the activity and the overlay of independent objects can be colorized to indicate the motion of different objects. The trajectories of tracked objects can also be shown as paths superimposed on the image.

When there are lots of objects moving, or there is movement around much of the field of view in the video, such visualizations become cluttered and less valuable. To address this problem, we provide a method for subdividing the single still image into a set of still images either by separating the time of the segment into sub segments or by separating the overlays of different objects onto different still images.

BRIEF DESCRIPTION OF THE DRAWINGS

Preferred embodiments of the present invention will be described in detail based on the following figures, wherein.

DETAILED DESCRIPTION OF THE INVENTION

Identifying Activity in Video

Techniques for generating action keyframes for a fixed-position camera based on the identification of activity in the video, an assessment of the importance of the activity, object recognition in the video, and interaction techniques for seeing more details of the video are presented.

The threshold for considering a pixel to be different from the background or a pixel in another frame determines the sensitivity to change and to video noise. In one embodiment of the invention, a threshold of 4%-6% of the luminance value range was determined to be a good compromise for the conflicting goals of sensitivity and suppression of noise and shadows. However, different thresholds might work better in different lighting conditions. Pixel values might have to be normalized across frames to deal with cameras with automatic gain control. More sophisticated approaches might be needed to be able to ignore a flickering light.

Assessing Importance of Activity

Events are identified by determining periods of activity which are considered of interest based on the amount of activity in the video, distance to points of interest in the space being videotaped, detected features such as people's faces, and events from other sensors, e.g. Radio Frequency Identification (RFID). If multiple cameras have the same point of interest in view, the distance measure to the point of interest can be improved by considering all cameras.

Visualizing Activity

In one embodiment of the invention, in order to visualize a period of activity in a video stream via a single keyframe, moving objects in frames in the video segment are alpha-blended to show motion. One could naively expect that moving objects can be shown by periodically sampling frames in the video and by creating a single image by averaging the pixels of the video frames. However, in such a combined frame, the background dominates and foreground objects are only faintly visible. Instead, we first separate the background (or non-moving objects) from the foreground (or moving objects). The sample rate of the frames determines how distinctly the foreground objects are perceived. Sample rates where moving objects do not overlap from one frame to the next work best. For normal security camera placements and people walking perpendicular to the camera view, sample rates between 0.5 and 2 frames per second work best. Much higher sample rates (e.g., 10 frames per second) cause significant overlap between foreground shapes in subsequent samples so that it is difficult to recognize those shapes. Rather than using fixed sample rates, one can also determine the amount of overlap of foreground shapes from different video frames and only select another sample if its foreground shapes do not overlap with the foreground shapes of the previous sample.

Figure 6:
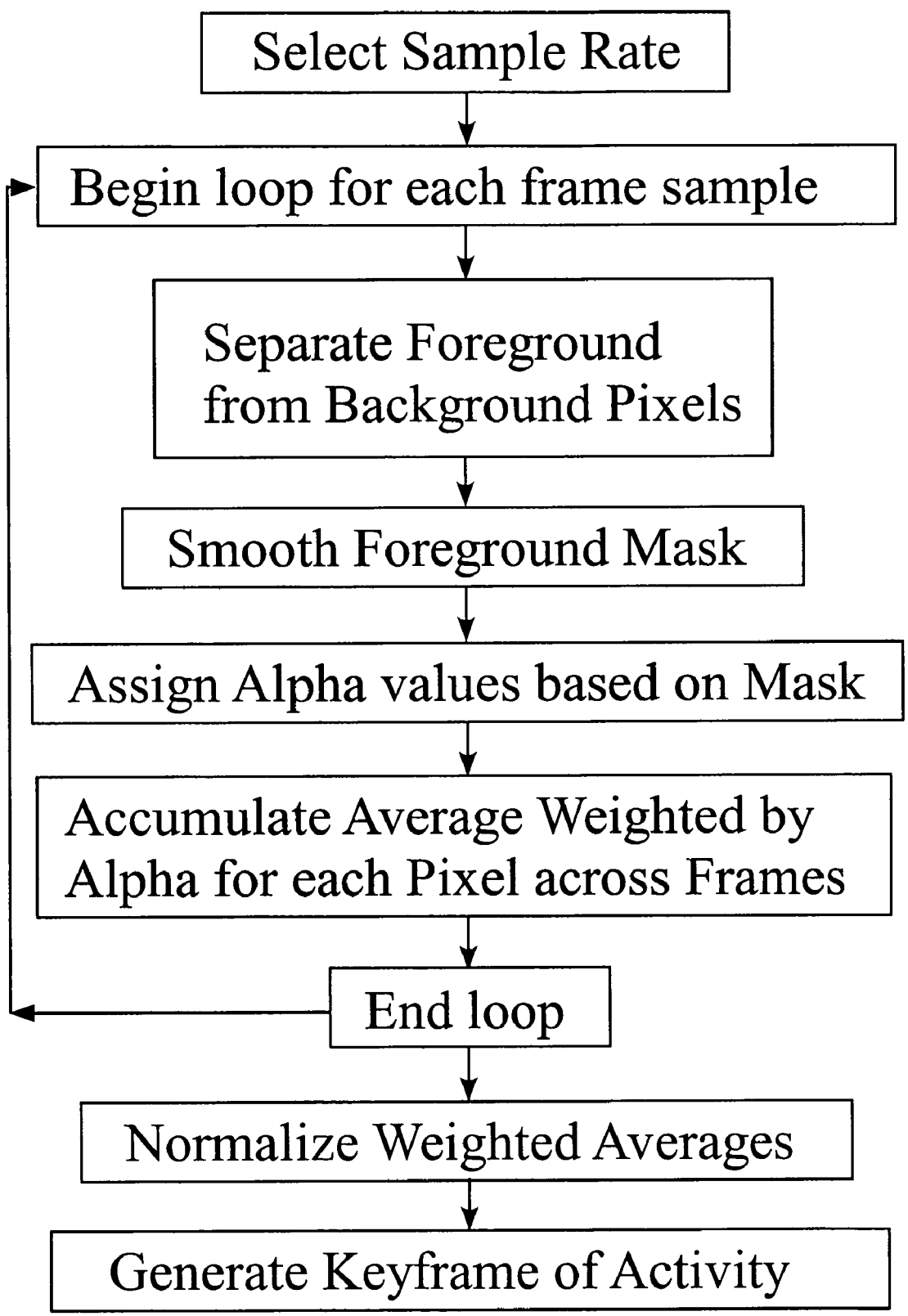
FIG. 6 shows a block diagram of steps involved in visualizing an activity corresponding to an event in a video stream and generating a keyframe of that activity.

For each sampled frame, an alpha mask is determined for blending it with all the other sampled frames. Each foreground pixel in a sample is assigned a high alpha value (high opacity) and each background pixel is assigned a much lower alpha value. The alpha values for each pixel are normalized across samples and a single blended value is computed for each pixel. To smooth the visualization of foreground pixels, the alpha mask of foreground pixels is blurred slightly, i.e., background pixels neighboring foreground pixels are assigned half the alpha value of foreground pixels. Alpha values for foreground pixels can be varied across samples or within a sample to emphasize certain samples or certain regions within a sample. FIG. 6 shows a block diagram of steps involved in visualizing an activity corresponding to an event in a video stream and generating a keyframe of that activity as pertains to one embodiment of the invention.

In various embodiments of the invention techniques are used to enhance visualization. The techniques can be used either individually or in combination. The following list of techniques is not considered to be limiting but rather representative of various embodiments of the invention.

Emphasize Foreground Pixels Periodically

Figure 1A:
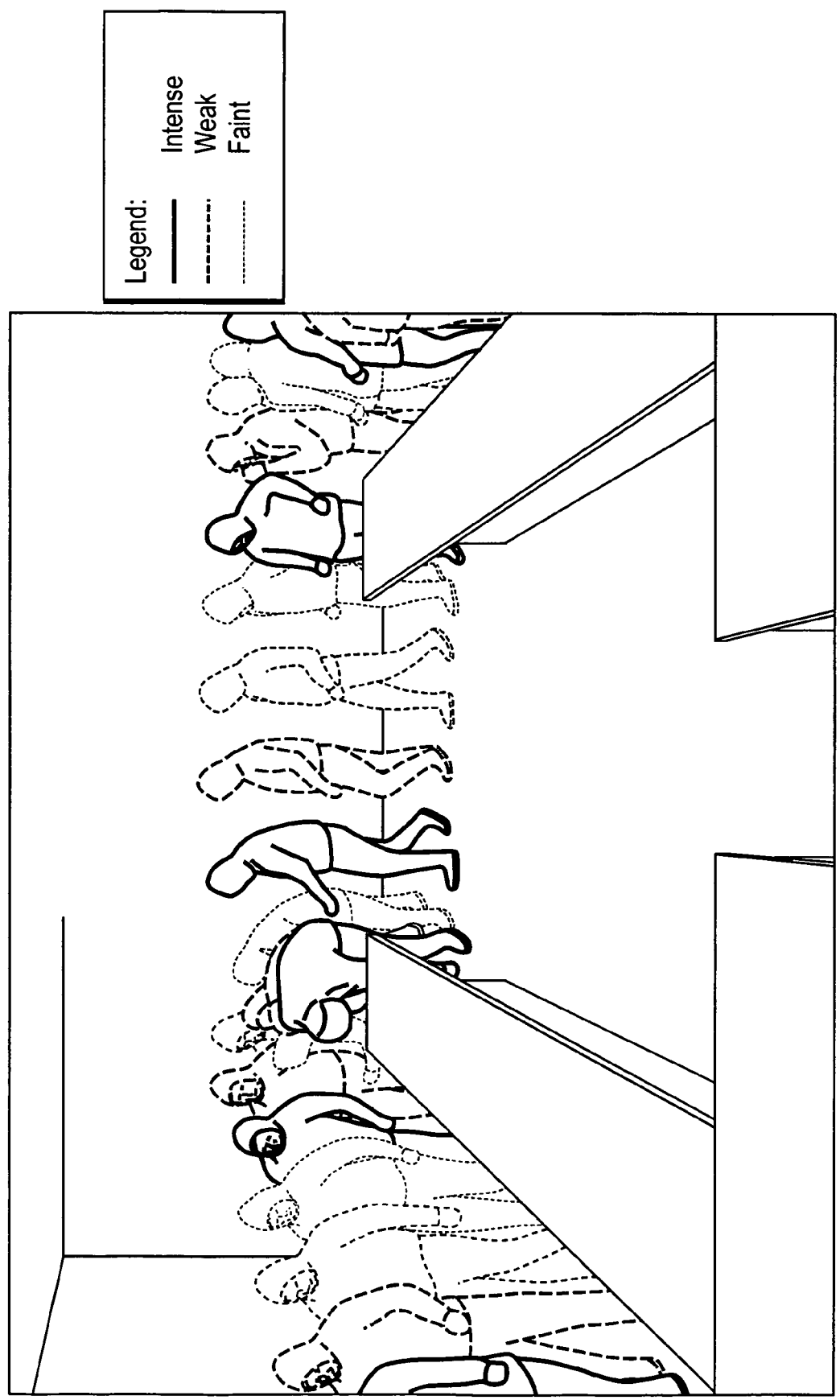
FIG. 1 shows an artists impression of FIG. 7, where the alpha-blended foreground with a sampling rate of 0.5 samples per second where in (A) emphasis is increased on every fourth sample with increased opacity of foreground pixels and where in (B) emphasis is increased around the important frame, illustrated using a continuous line to correspond with an intense figure, a dashed line to correspond with a weakly discerned figure and a dotted line to correspond with a faintly perceived figure (where faintly perceived is less intense than weakly discerned)
Figure 1B:
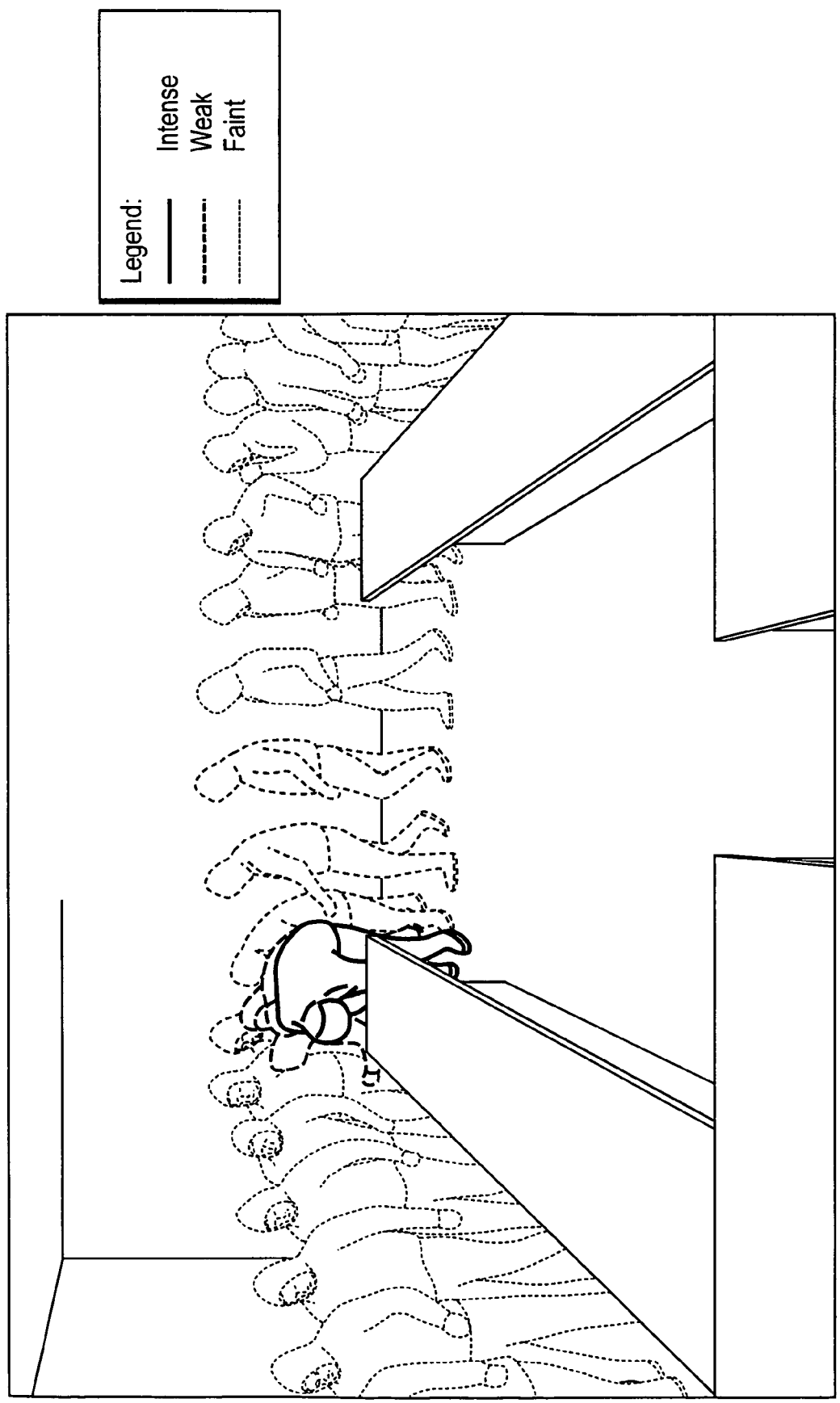
Figure 7A:
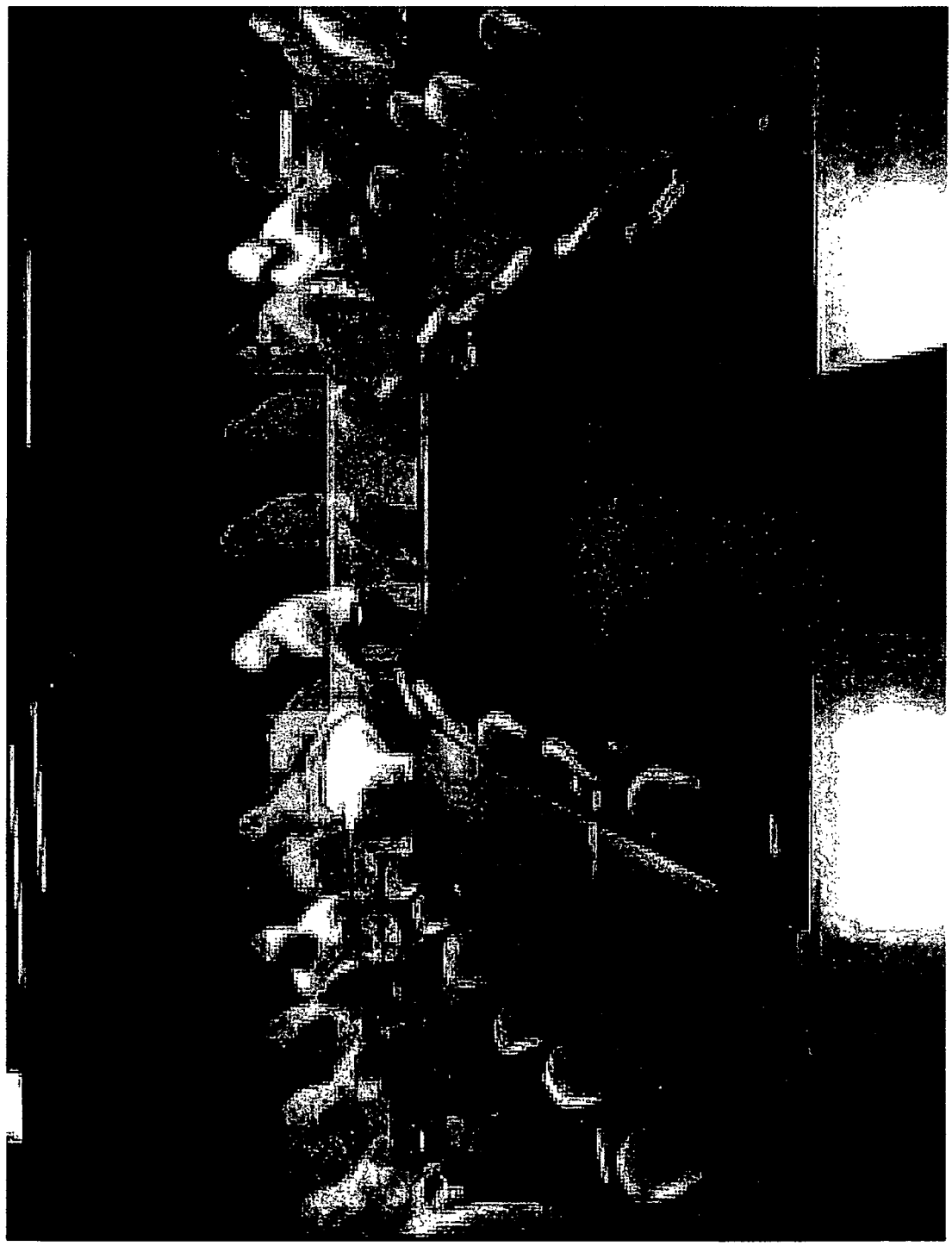
FIG. 7 shows the alpha-blended foreground with a sampling rate of 0.5 samples per second where in (A) emphasis is increased on every fourth sample with increased opacity of foreground pixels and where in (B) emphasis is increased around the important frame.
Figure 7B:

In one embodiment of the invention, emphasizing foreground pixels periodically (e.g., every fourth sample) by increasing their opacity can be used to provide more detail without causing too much overlap in the motion. FIGS. 1 and 7 show the alpha-blended foreground with 0.5 samples per second, where (A) shows more emphasis for every fourth sample with increased opacity of foreground pixels and (B) shows more emphasis around the important frame. In FIG. 1, emphasis is illustrated using a continuous line to correspond with an intense figure, a dashed line to correspond with a weakly discerned figure and a dotted line to correspond with a faintly perceived figure (where faintly perceived is less intense than weakly discerned). This approach can be combined with the technique to avoid overlapping shapes described above by sampling frames at a fixed rate but only to emphasize them if the foreground shapes do not overlap with the previous emphasized sample. This combination still allows the user to estimate the movement speed from the samples collected at a fixed rate without making the display too "busy."

Tint with a Translucent Color

Figure 2A:
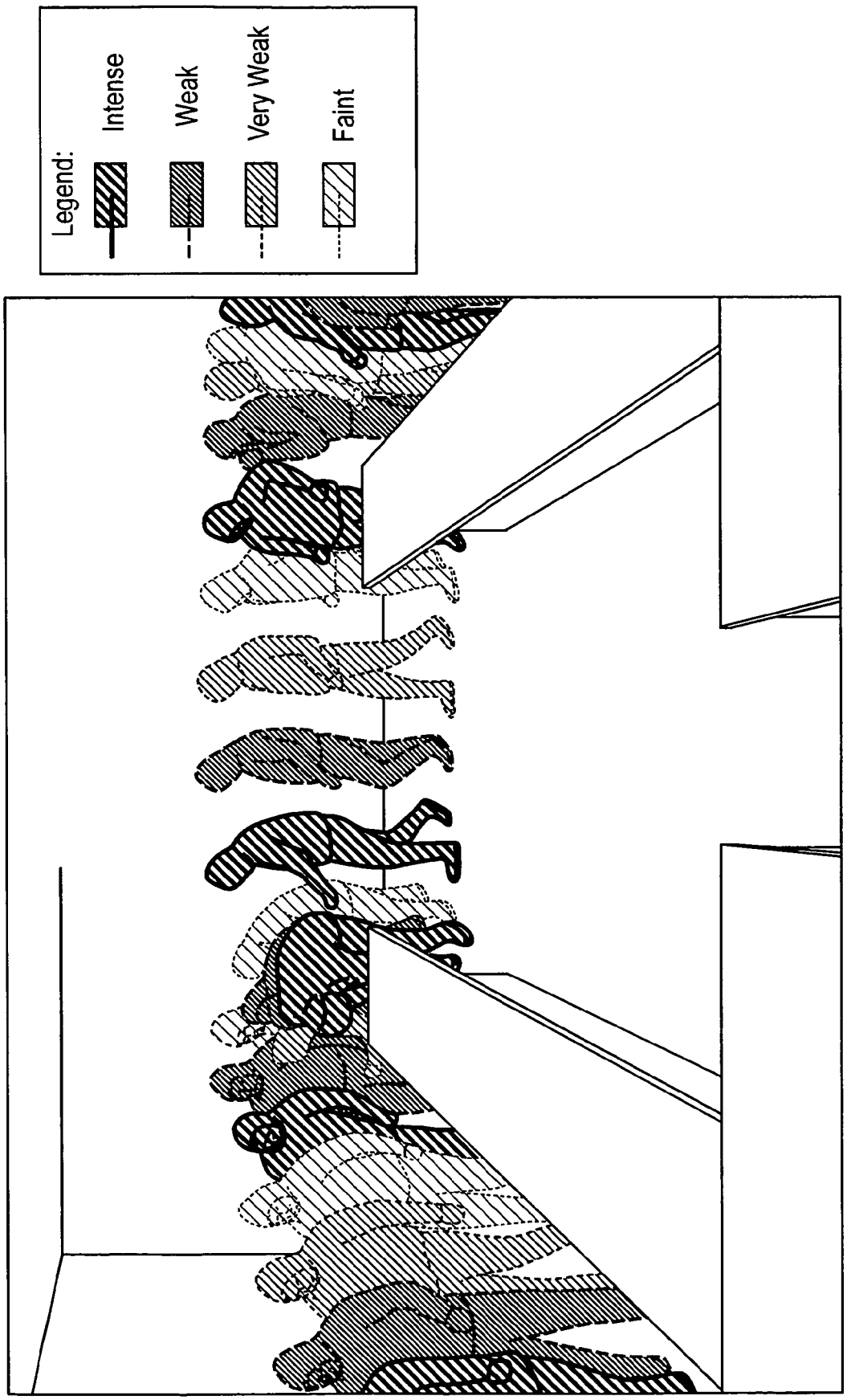
FIG. 2 shows an artists impression of FIG. 8, where the visualization of FIG. 7 is tinted where in (A) the tinting is in the foreground and where in (B) the tinting is emphasized around the important frame, illustrated using a continuous line and thick diagonal shading to correspond with an intense tinted figure, a dashed bold line and closely spaced vertical shading to correspond with a weakly tinted figure, a dashed normal intensity line and normal spaced vertical shading to correspond with a very weakly tinted figure, a dotted line and broad spaced vertical shading to correspond with a faintly tinted figure and a dotted line and no shading correspond with a very faintly tinted figure (where very faintly tinted is less intense than faintly tinted, which is less intense than very weakly tinted, which is less intense than weakly tinted, which is less intense than intense)
Figure 2B:
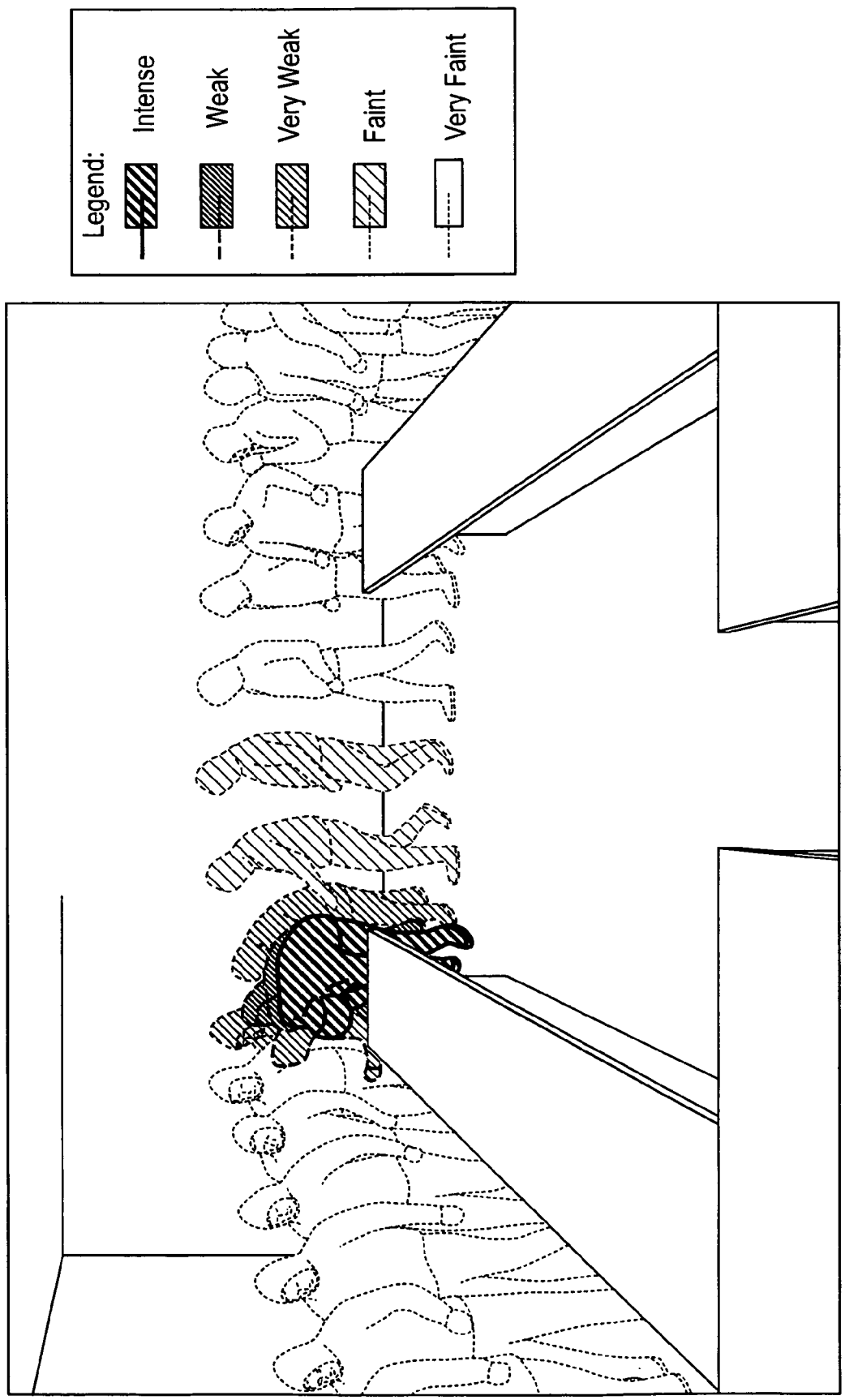
Figure 8A:
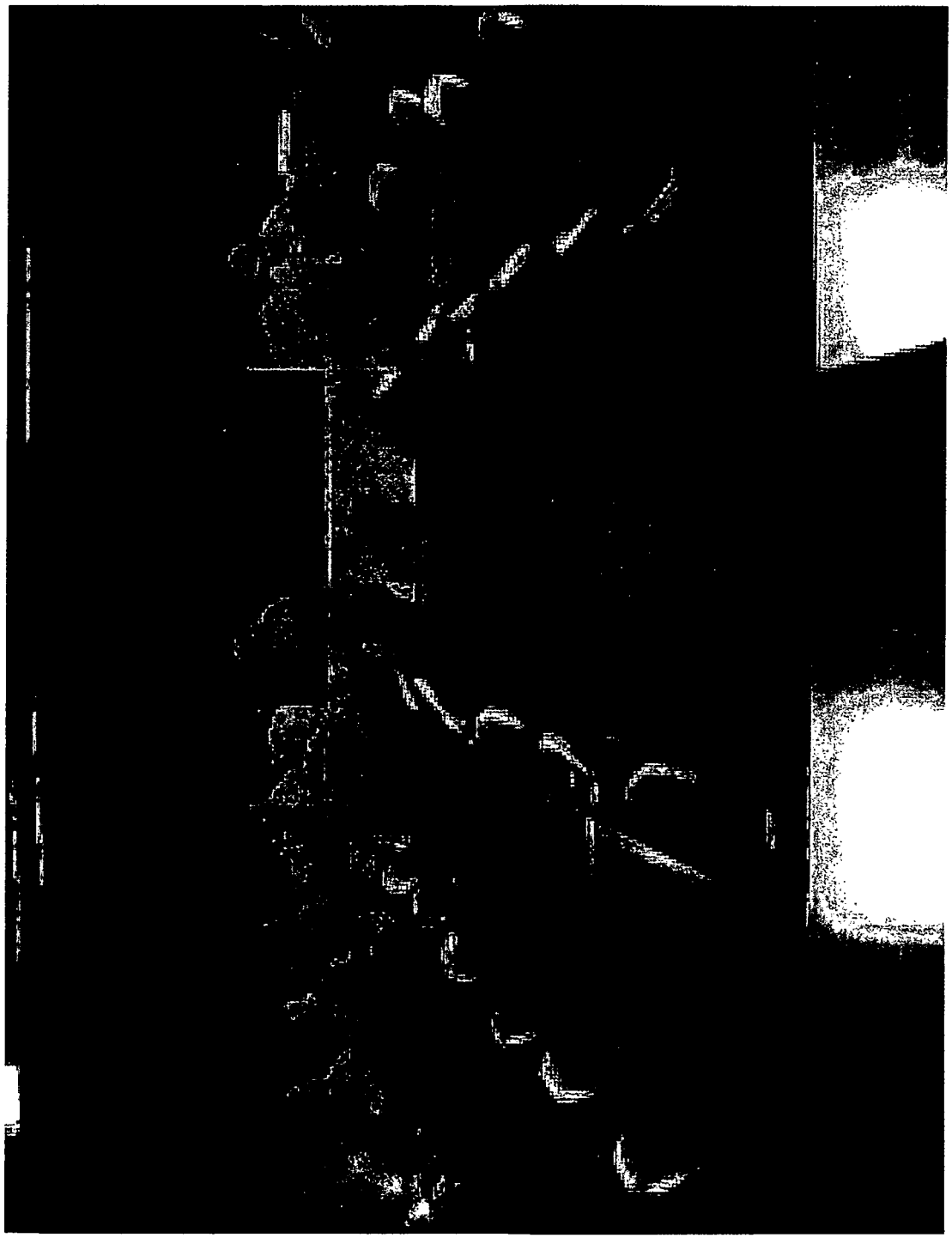
FIG. 8 shows tinting where in (A) the tinting is in the foreground and where in (B) the tinting is emphasized around the important frame.
Figure 8B:
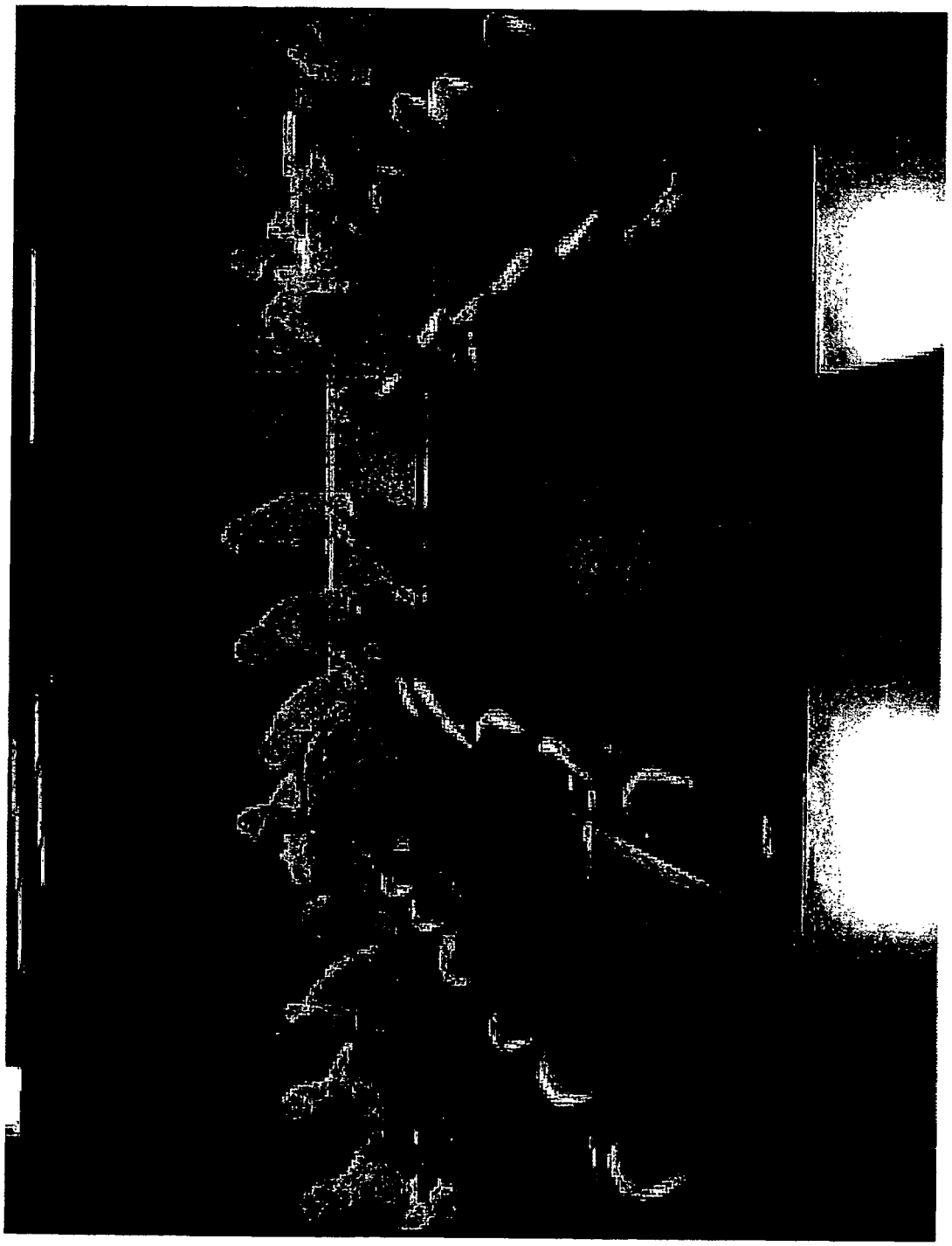

In one embodiment of the invention, tinting foreground pixels with a translucent color can also be used to visualize activity across video frames. The tinting color can be varied over time to indicate temporal order in situations with overlapping motion tracks. FIGS. 2 and 8 show FIG. 7 with tinting, where in (A) the foreground is tinted and in (B) the tinting emphasizes an important frame. The tinting in FIGS. 2(A) and 2(B) is illustrated using a continuous line and thick diagonal shading to correspond with an intense tinted figure, a dashed bold line and closely spaced vertical shading to correspond with a weakly tinted figure, a dashed normal intensity line and normal spaced vertical shading to correspond with a very weakly tinted figure and a dotted line and broad spaced vertical shading to correspond with a faintly tinted figure (where faintly tinted is less intense than very weakly tinted, which is less intense than weakly tinted).

Figure 3A:
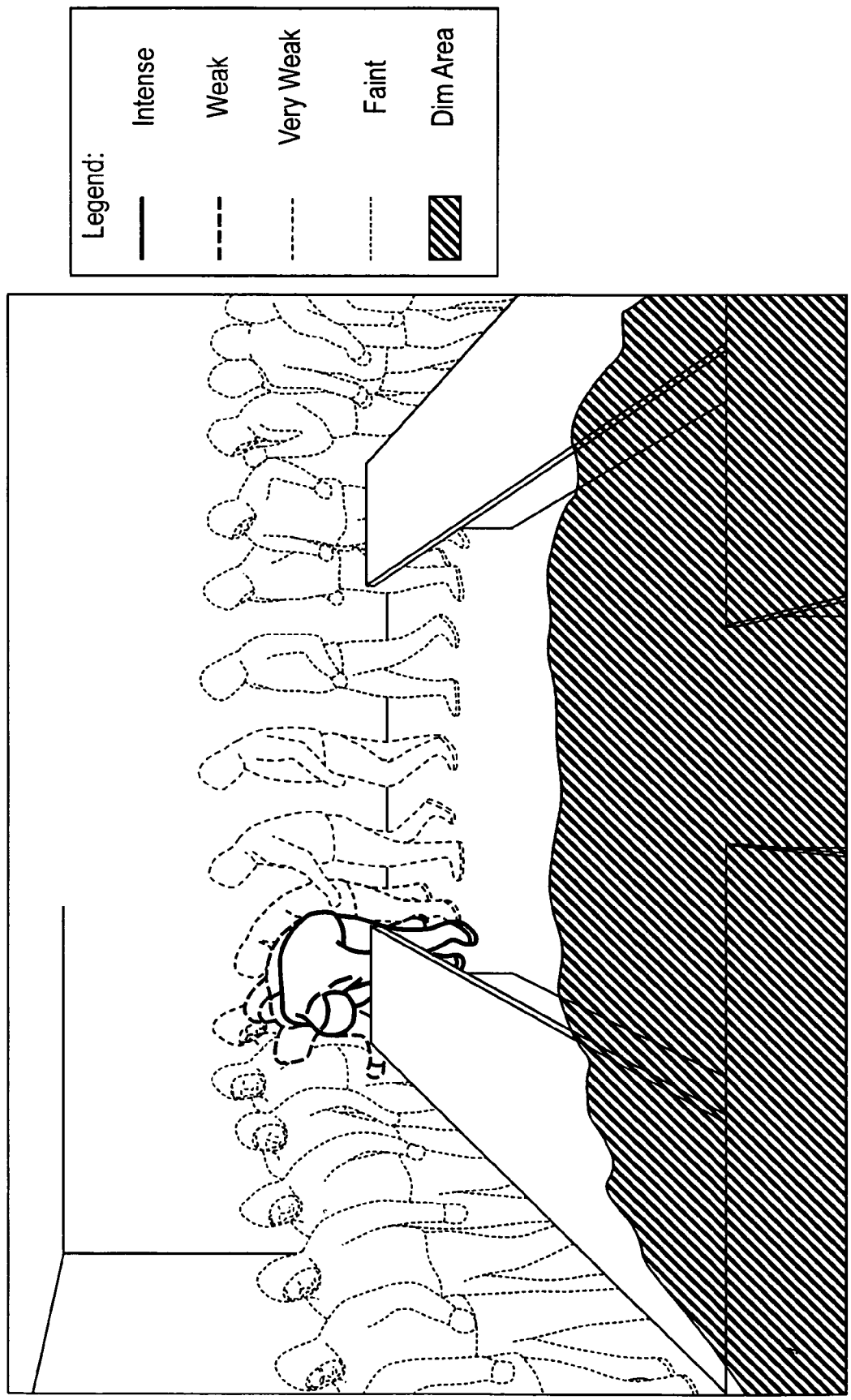
FIG. 3 shows an artists impression of FIG. 9, where areas in FIG. 7 without foreground activity are shown dimmed; (A) with time-lapse, illustrated using a continuous line to correspond with an intense figure, a dashed bold line to correspond with a weakly discerned figure, a dashed normal intensity line to correspond with a very weakly discerned figure, a dotted line to correspond with a faintly perceived figure and thick diagonal shading to correspond with the dim area (where faintly perceived is less intense than very weakly discerned, which is less intense than weakly discerned) and (B) only the background, illustrated using thick diagonal shading to correspond with the dim area.
Figure 3B:
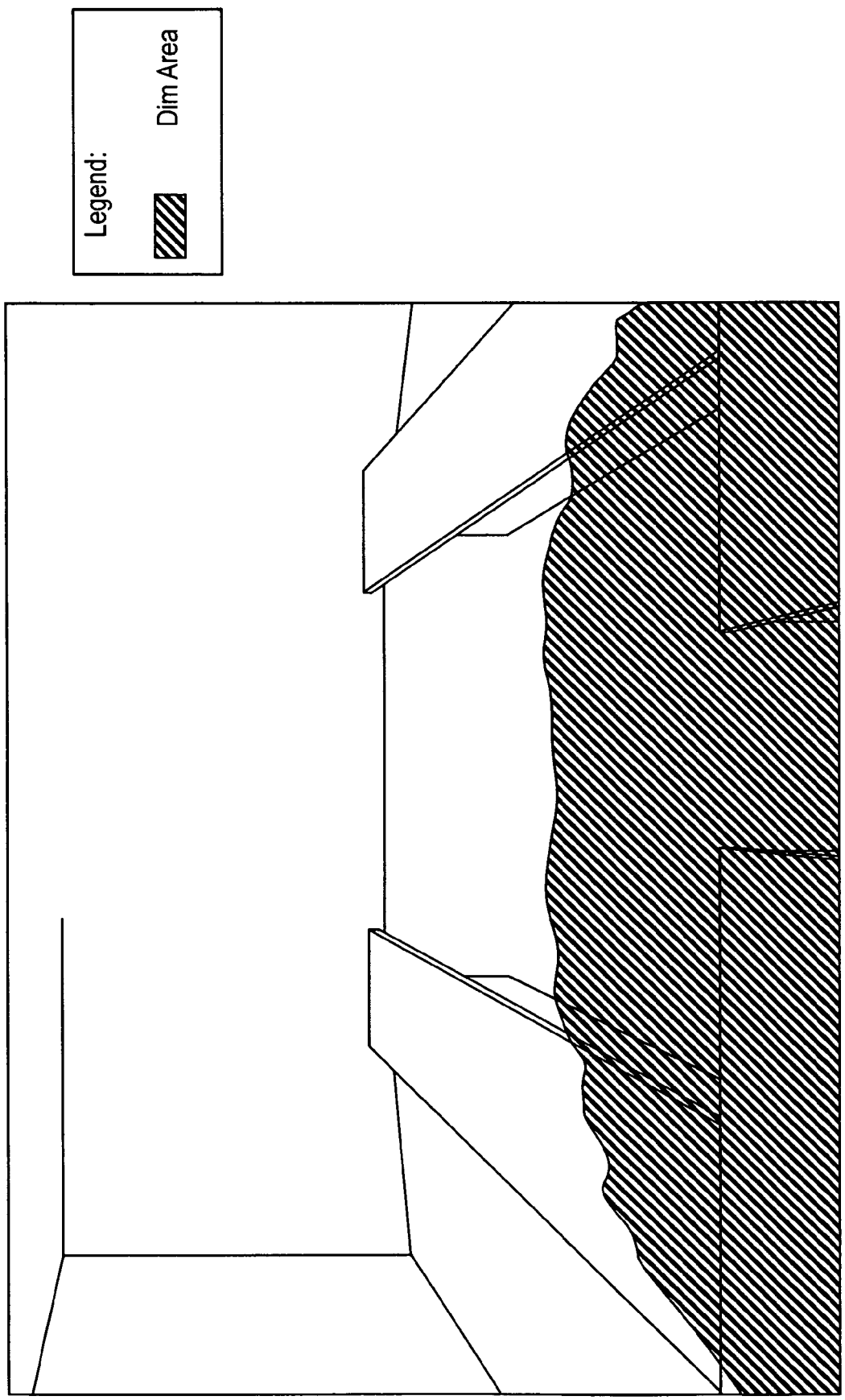
Figure 9A:
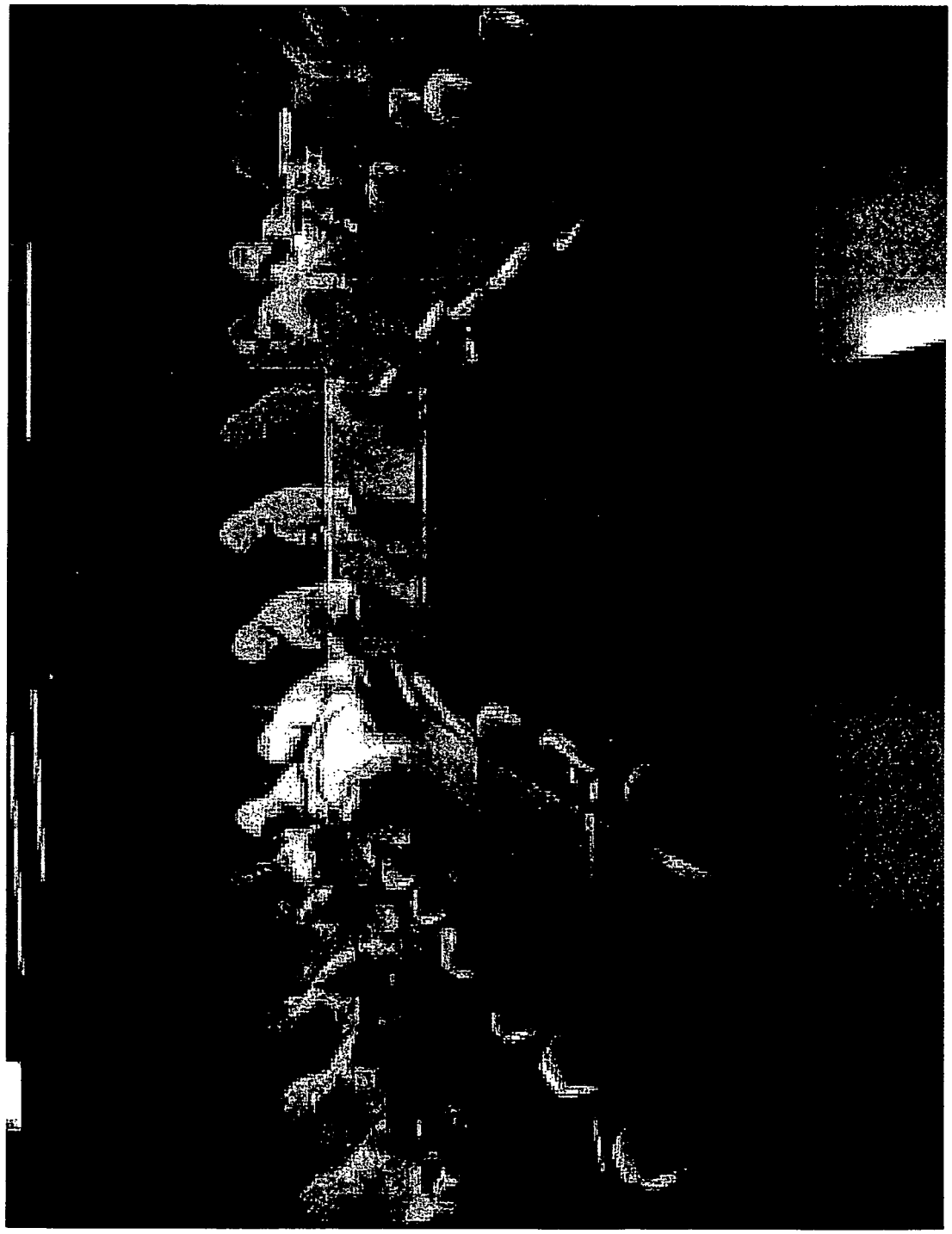
In FIG. 9 foreground activity is shown dimmed; (A) with time-lapse and (B) only the background.
Figure 9B:
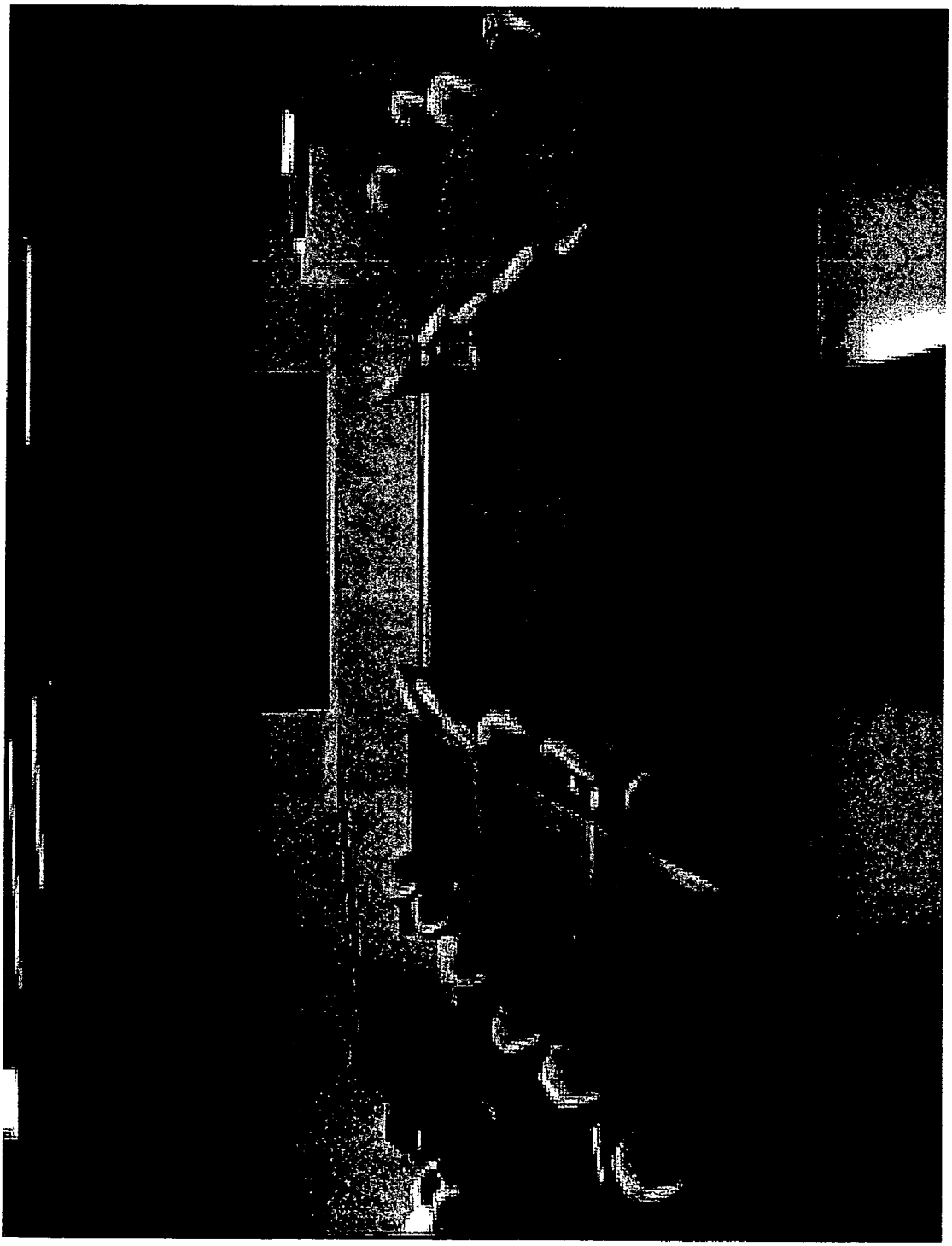

In another embodiment of the invention, tinting background pixels with a translucent color (e.g., gray in FIG. 3 or red in FIG. 9) or reducing the saturation of the background pixels towards grayscale by mixing their color with the luminance of their color can be used to visualize activity across video frames. Rather than changing all background pixels, pixels can be gradually changed based on their distance from the nearest pixel that was ever part of the foreground. FIGS. 3 and 9 show areas without foreground activity dimmed down with (A) time-lapse and (B) only the background. The dim areas are illustrated in FIGS. 3(A) and (B) using thick diagonal shading, while the intensity of the actor in FIG. 3(A) is illustrated with a continuous line to correspond with an intense figure, a dashed bold line to correspond with a weakly discerned figure, a dashed normal intensity line to correspond with a very weakly discerned figure, a dotted line to correspond with a faintly perceived figure (where faintly perceived is less intense than very weakly discerned, which is less intense than weakly discerned).

Halo Around Shapes

Figure 4A:
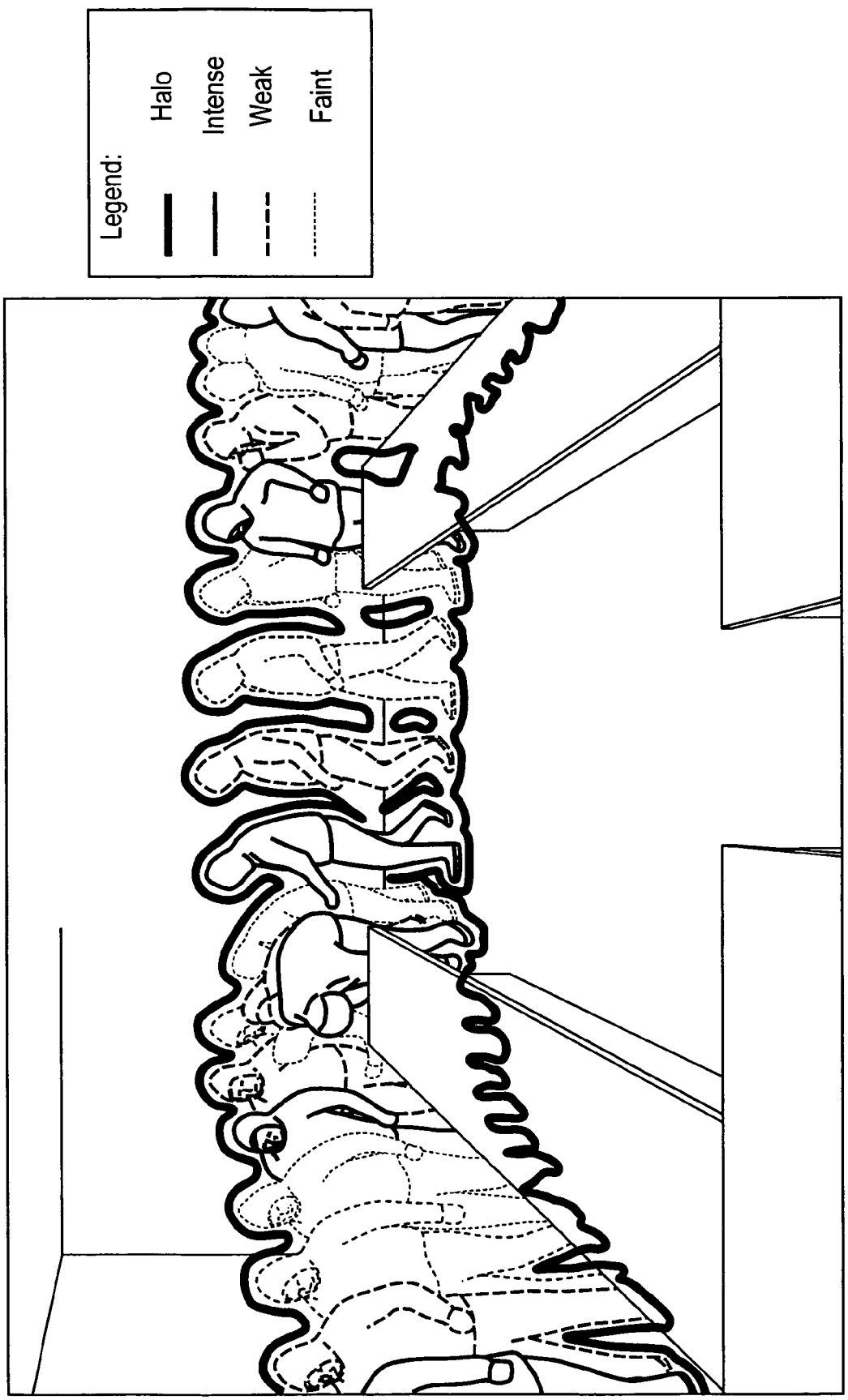
FIG. 4 shows an artists impression of FIG. 10, where features in FIG. 7 are accentuated using a red halo (A) to emphasize all foreground pixels and (B) the foreground pixels of an important sample, where a bold continuous line is used to correspond with the red halo in FIG. 10, a continuous line is used to correspond with an intense figure, a dashed line to correspond with a weakly discerned figure and a dotted line to correspond with a faintly perceived figure (where faintly perceived is less intense than weakly discerned)
Figure 4B:
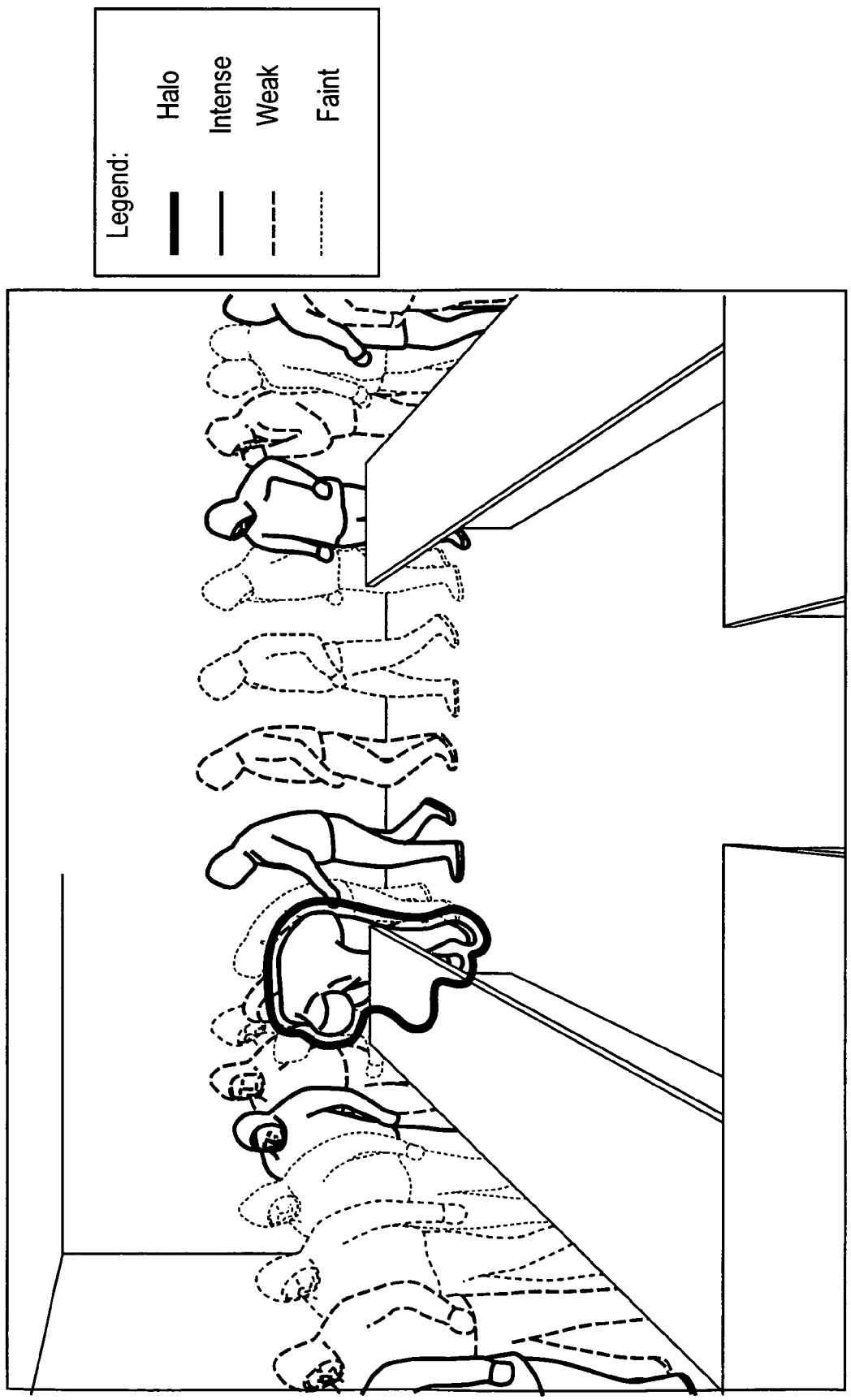
Figure 10A:
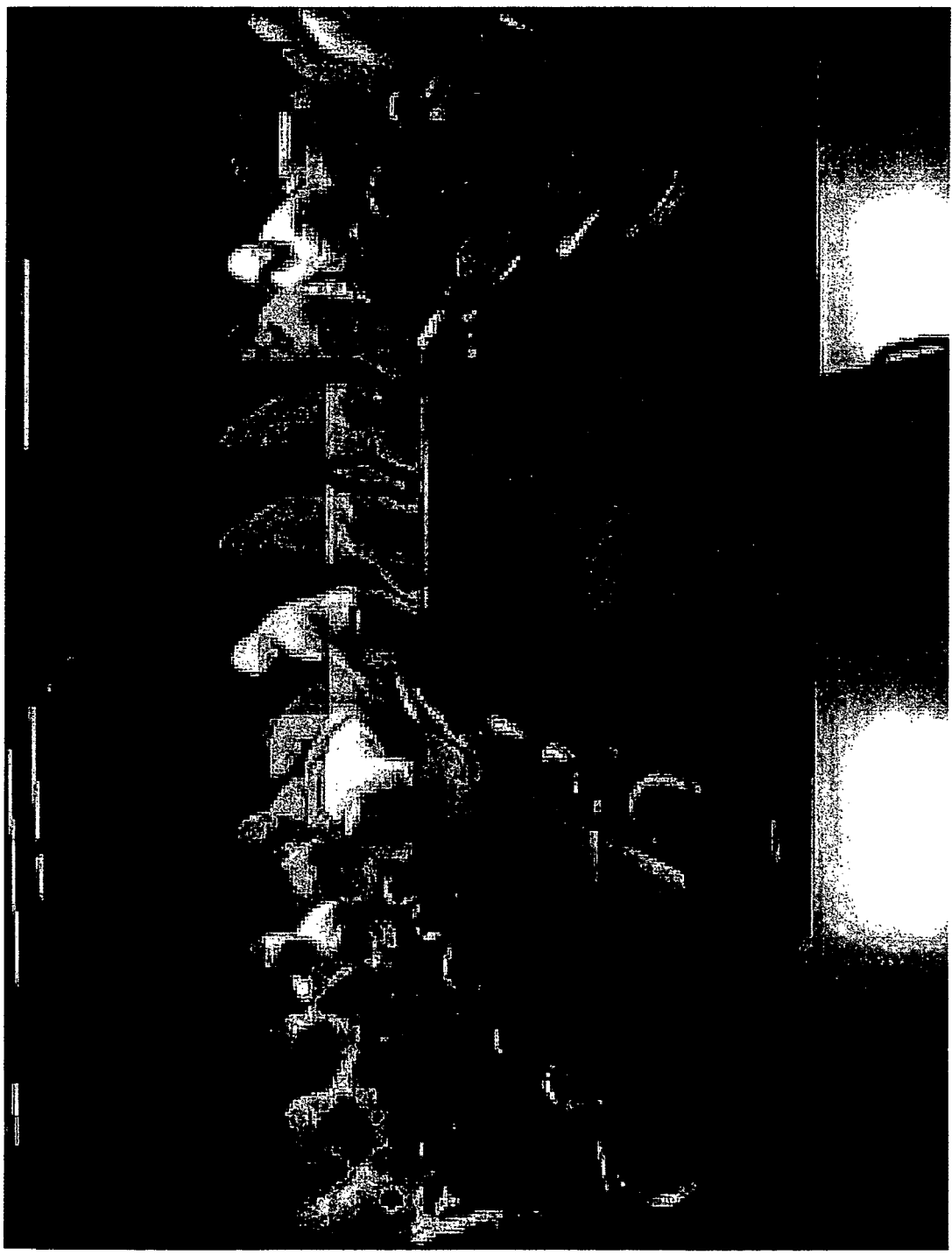
In FIG. 10 features are accentuated using a red halo (A) to emphasize all foreground pixels and (B) the foreground pixels of an important sample.
Figure 10B:
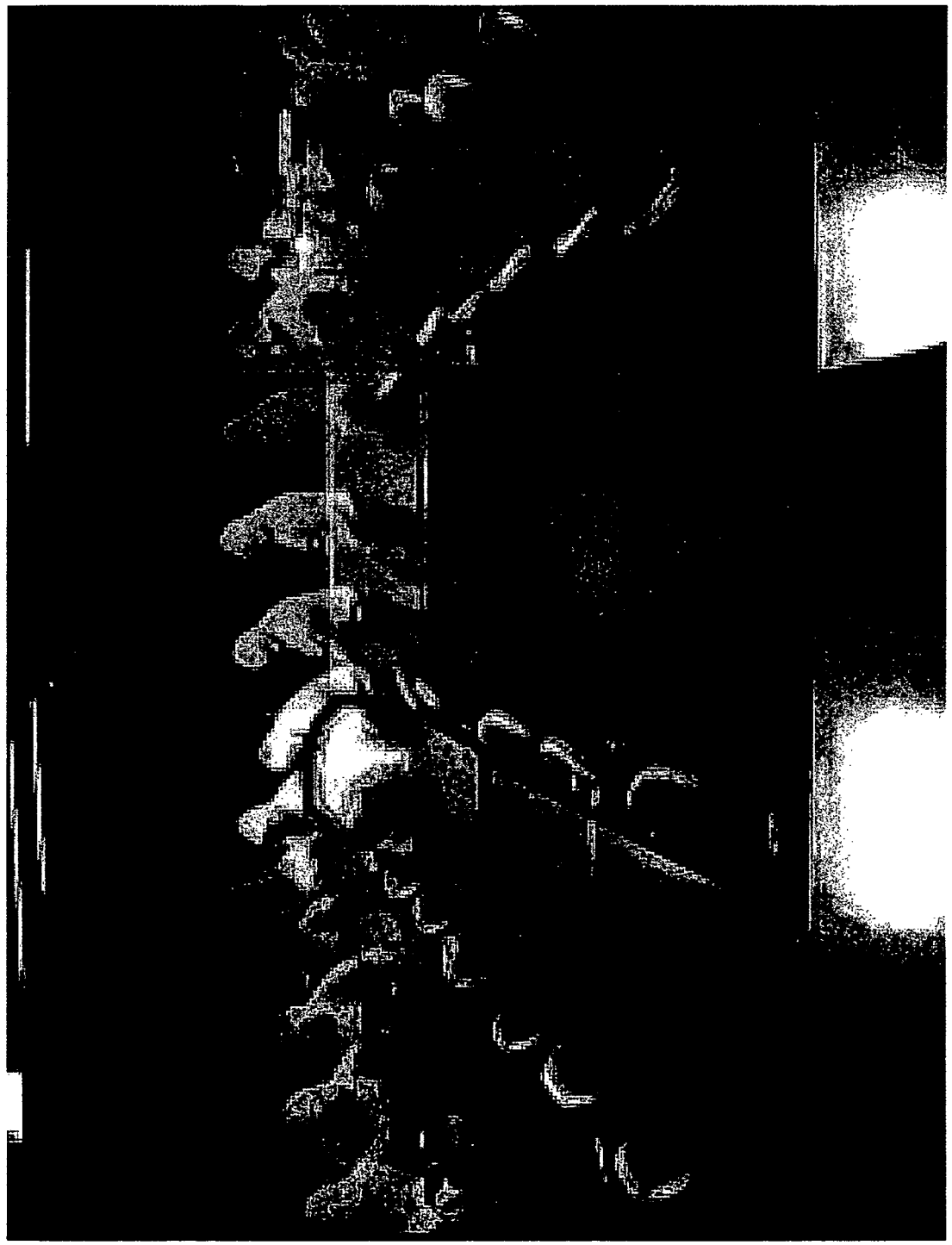

In an embodiment of the invention, drawing a colored halo around the shapes created by the foreground pixels can also be used to visualize activity across video frames. Shapes should be filled where possible by including pixels surrounded by foreground pixels and stray foreground pixels should be ignored. FIGS. 4 and 10 use (A) a halo to emphasize either all foreground pixels or (B) the foreground pixels of an important sample. In FIG. 4, the red halo of FIG. 10 is illustrated using a bold continuous line, while a continuous line is used to correspond with an intense figure, a dashed line to correspond with a weakly discerned figure and a dotted line to correspond with a faintly perceived figure (where faintly perceived is less intense than weakly discerned).

Weighting Importance in Visualization

In one embodiment of the invention, importance of action within the video segment can be indicated by making important activity more opaque and less important activity more transparent. The techniques for enhancing the visualization listed above can be applied selectively to highlight important activity. Opacity or tinting can be varied either by temporal distance to an important time or by spatial distance to a hot spot in the video frames. If objects are recognized (e.g., via face recognition), the enhancement techniques can be applied just to that object.

User Interaction

In another embodiment of the invention, users may click with the mouse either on a single video frame or a generated keyframe. If an object is identified near the mouse position, that object is marked as important and tracked across frames. The visualization options described above are then applied to just that object.

Clicking on a generated keyframe can also be mapped back to a time, either by identifying objects or just by comparing the mouse position to the centroids of the foreground pixels of the sampled video frames. The centroid closest to the mouse position determines the corresponding time. Users may also specify a period of time by dragging the mouse over a region, which is taken as selecting an interval defined by the minimum and maximum times associated with centroids in that region. Once the time (or interval) is determined, either the video can be played at that time or the time can be highlighted in the generated keyframe. The latter can be accomplished easily by alpha-blending the video frame at that time with the generated keyframe. When an interval is specified, a new keyframe can be generated that just visualizes the specified interval.

Object Identification and Tracking

In yet another embodiment of the invention, objects can be identified by using time stamps for each pixel and by grouping nearby pixels with similar time stamps into shapes as described above. Objects can be tracked across frames by finding shapes in more recent frames that are similar to shapes in older frames and consistent under assumptions of maximum movement speed. In cases where different shapes merge and split again, assumptions can be made regarding the identity of the shapes when considering their movement trajectories.

Visualization of Independent Objects

In a further embodiment of the invention, the activity of independent objects can be visualized by tinting/colorizing the overlays of each object with a different color. Alternatively, halos of different colors can be drawn around the objects.

Expanding Visualization by Time or by Objects

In another embodiment of the invention, when visualization is too busy or complex, the single keyframe visualization can be subdivided. While reducing the sampling rate can make a visualization less busy if there are slow-moving or groups of objects, this does not help with objects reversing directions or different objects moving in different directions at different times. Overlapping foreground shapes from frames with a large temporal distance are an indication of this situation. In such cases the activity segment's time can be partitioned into subsegments that avoid such overlaps and can be visualized independently. The period of action is divided into shorter period of equal or different lengths and independent action keyframes are created for each smaller time slice of the period of activity.

An alternative subdivision is to separate the independent objects such that each keyframe includes the activity of only a subset of the objects identified. A set of action keyframes is created such that each displays only the action of a subset of the objects in the period of activity. For each of those action keyframes, only the foreground pixels of the selected objects are blended with the background pixels.

The single keyframe visualization can be subdivided either automatically if the system detects too much overlap or if the user requests it.

Other Visualization Options

Figure 5A:
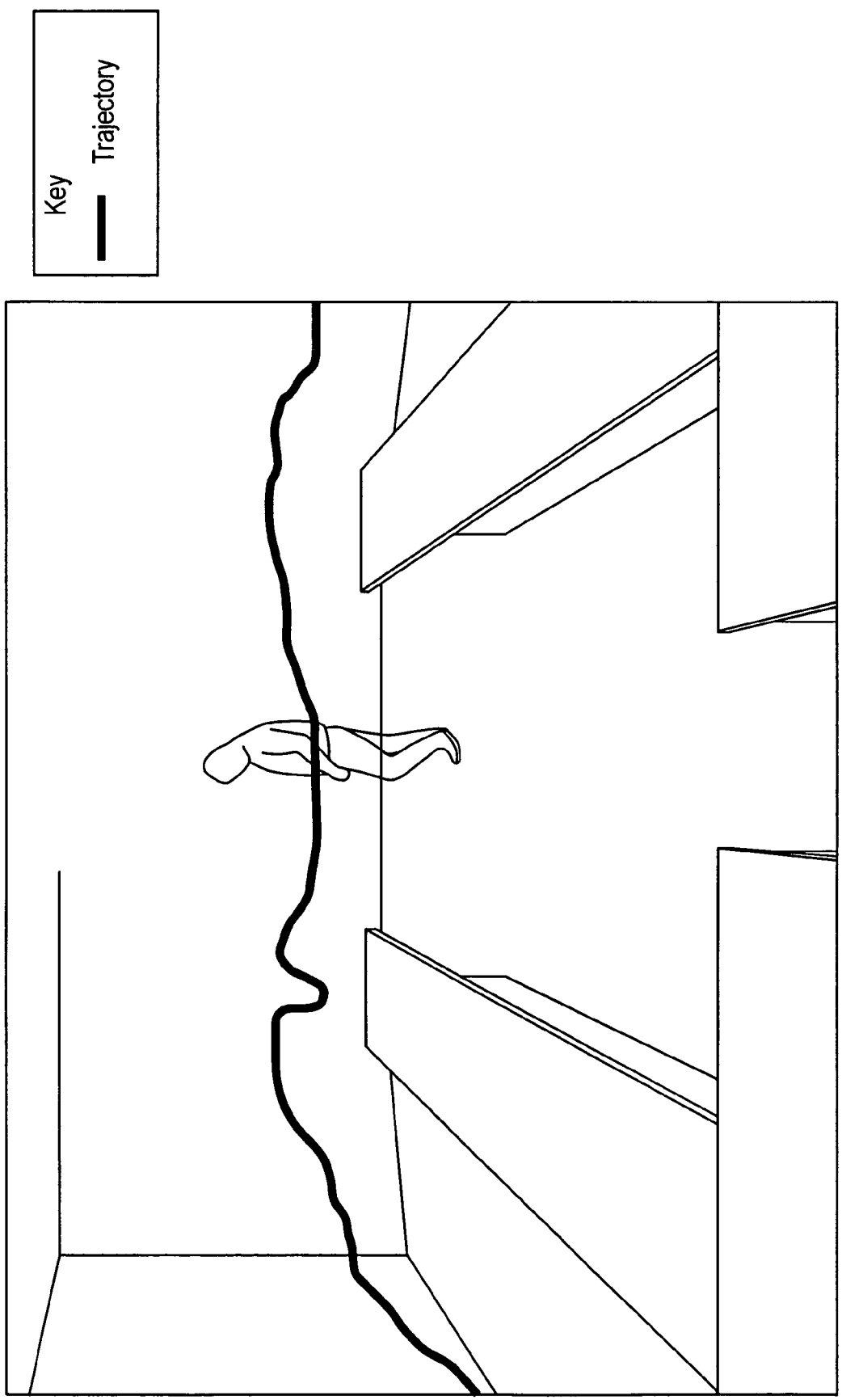
FIG. 5 shows an artists impression of FIG. 11, which shows the trajectory of a tracked object; (A) shown as a continuous trajectory, illustrated using a bold continuous line and (B) shown as positions at regular intervals (delta T=0.6 sec), illustrated using a circle.
Figure 5B:
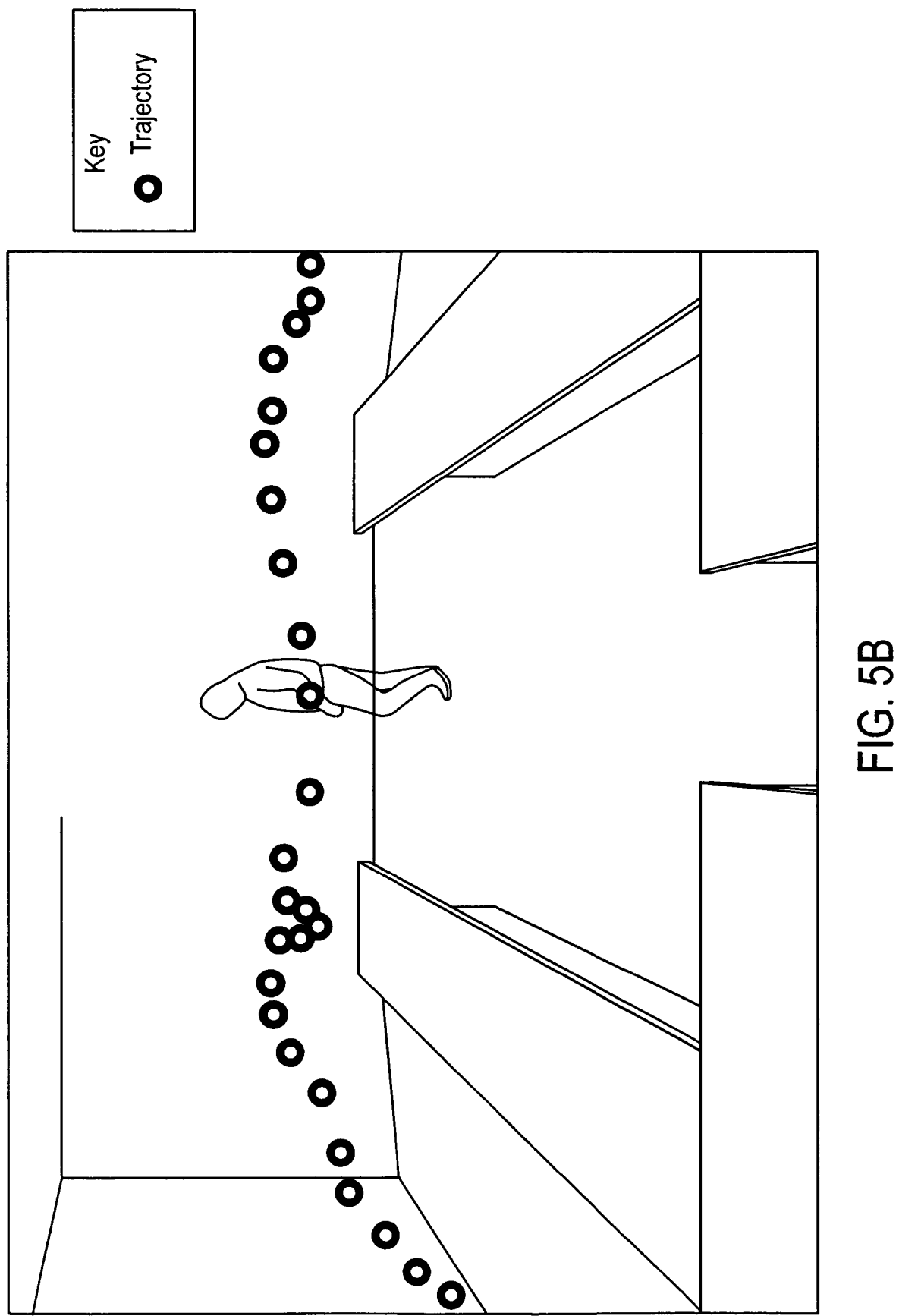
Figure 11A:
FIG. 11 shows the trajectory of a tracked object; (A) shown as a continuous trajectory and (B) shown as positions at regular intervals (delta T=0.6 sec).
Figure 11B:
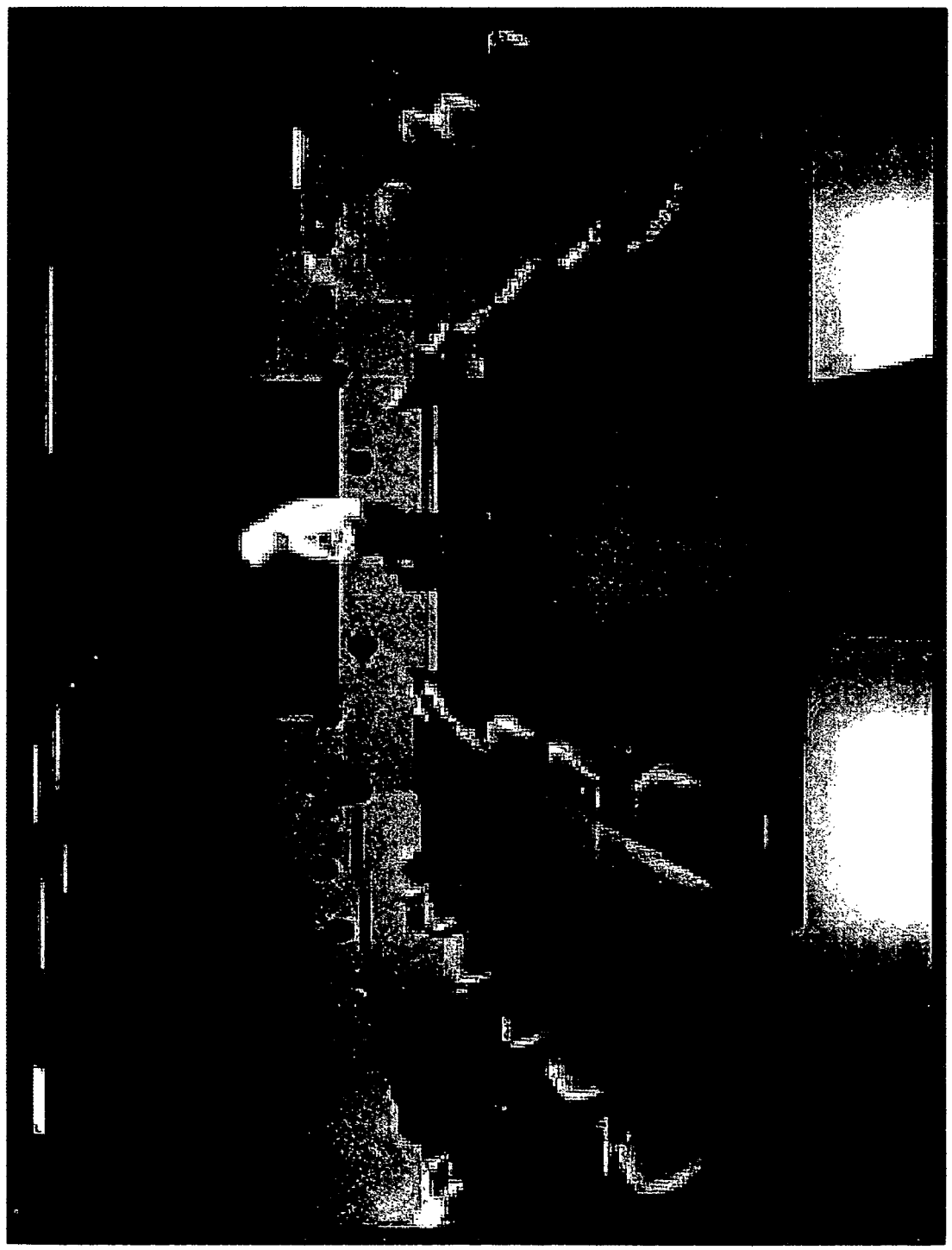

In another embodiment of the invention, instead of alpha-blending the foreground pixels with background pixels, foreground pixels at different times can be visualized with more abstract representations. One representation takes advantage of object tracking. The trajectories of objects, or representative parts of objects, (e.g., the highest point, or corners in detected edges), are shown over time as lines, or as a series of points taken at regular time intervals. FIGS. 5 and 11 the trajectory of a tracked object is shown as (A) a continuous trajectory, illustrated using a bold continuous line and (B) positions at regular intervals (delta T=0.6 sec), illustrated using a circle in FIG. 5 and red dots in FIG. 11. Such lines indicate object motion without being as visually cluttered as several visualizations of the same object at different times. This may be especially useful when multiple objects pass through common regions. The trajectory lines can use color-coding to indicate temporal relationship. The color-coding helps indicate whether apparently intersecting trajectory lines actually intersect at a common time (i.e. of whether the objects really passed near each other.) Trajectory lines can be combined with alpha blending of foreground pixels at a lower sample rate such that infrequent visualizations of a moving object would be connected by trajectory lines. Because each point on a trajectory corresponds to a point in time, users may specify times or time intervals by clicking or dragging along shown trajectory lines.

Applications

Reduced representations of video segments are valuable in any situation where an overview or summary of physical activity in video is useful. This includes summaries of action in security video segments and segments of video returned via searches to a video library. They are especially useful due to the relatively low bandwidth required to provide a single still image that represents a video segment.

Various embodiments of the invention may be implemented using a processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of component circuits, as will be readily apparent to those skilled in the art.

Various embodiments include a computer program product which can be a storage medium (media) having instructions and/or information stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage devices, ROMs, RAMs, EPROMs, EEPROMs, DRAMs, PRAMS, VRAMs, flash memory devices, magnetic or optical cards, nano-systems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions and/or information, which can be used by one or more processors to perform any of the features, presented herein. In various embodiments, the transmission may include a plurality of separate transmissions.

Stored on one or more computer readable media, the present disclosure includes software for controlling the hardware of the processor(s), and for enabling the computer(s) and/or processor(s) to interact with a human user or other device utilizing the results of the present invention. Such software may include, but is not limited to, device drivers, interface drivers, operating systems, execution environments/ containers, user interfaces and applications.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers, interface drivers and remote software to do the function. The invocations or calls can include invocations or calls in distributed and client/server systems One embodiment the invention is a method of visualizing an activity corresponding to an event in one or more frames comprising the steps of: (a) classifying each pixel in the plurality of frames as representing a foreground object or a background object; (b) assigning one or more alpha mask values for each classified pixel in each frame; (c) manipulating the alpha values; and (d) applying the alpha values to each pixel to visualize the activity.

In another embodiment of the invention, the frames are part of a video stream and step (a) further comprises the steps of selecting an optimal sampling rate to separate the pixels corresponding with foreground objects from the pixels corresponding with background objects.

In another embodiment of the invention, the foreground pixels are separated from the background pixels by determining if there is change above a threshold in a pixel between frames sampled at the selected sample rate.

In another embodiment of the invention, the foreground pixels are separated from the background pixels by setting a threshold luminance to determine if there is movement in a pixel between frames sampled at the selected sample rate. In another embodiment of the invention, the optimal sample rate is a fixed sample rate. In another embodiment of the invention, the optimal sample rate is a variable sample rate.

In another embodiment of the invention, an alpha mask is computed for foreground object pixels and a separate alpha mask is computed for background pixels.

In another embodiment of the invention, the alpha values are manipulated by applying one or more of the functions selected from the group consisting of normalizing the alpha values for each pixel in each frame of the video stream, smoothing the alpha mask applied to each pixel and varying the alpha masked values applied to each pixel.

In another embodiment of the invention, the function of smoothing the alpha mask involves applying a separate smoothed alpha mask to foreground pixels.

In another embodiment of the invention, the smoothed alpha mask values are varied across the sample or within the sample to emphasize an activity or region within a sample.

In another embodiment of the invention the alpha mask opacity is increased.

In another embodiment of the invention, foreground pixels are tinted with a translucent color; whereby the tinting color can be varied over time to indicate temporal order.

In another embodiment of the invention, background pixels are tinted with a translucent color; whereby the tinting color applied to the background pixel can be varied based on the distance of the pixel from the nearest pixel that was ever part of the foreground.

In another embodiment of the invention, the saturation of the background pixels towards grayscale is reduced by mixing their color with the luminance of their color; whereby the mixing color applied to the background pixel can be varied based on the distance of the pixel from the nearest pixel that was ever part of the foreground.

In another embodiment of the invention, a colored halo is drawn around the shape created by the foreground pixels.

In another embodiment of the invention, one or more keyframes of one or more events in the video stream are used to visualize activities; wherein the keyframes further comprise an alpha blend of objects from different times.

In another embodiment of the invention, one or more keyframes of one or more events in the video stream are used to visualize activities; wherein the keyframes further comprise showing object trajectories.

In another embodiment of the invention, a user can highlight the shape and track the position of one or more interesting features in the video by clicking on one or more shapes in a single video frame or in a keyframe.

In another embodiment of the invention, the color and/or transparency of different objects can be altered to emphasize activity.

In another embodiment of the invention, the trajectory of different objects are highlighted in separate keyframes.

In another embodiment of the invention, an activity observed in one keyframe is used to identify an object; wherein the object is further identified in other keyframes based on time.

In another embodiment of the invention, the sampling rate is between about 0.5 frames per second and about 2 frames per second.

In another embodiment of the invention, the threshold luminance is between: about 4%; and about 6%.

In another embodiment of the invention a program of instructions executable by a computer to visualize an activity corresponding to an event in a video stream comprising the steps of: distinguishing whether a pixel represents a foreground object or a background object; computing an alpha mask for each video frame foreground pixel and video frame background pixel; normalizing the alpha values for each pixel throughout each frame of the video stream; smoothing the alpha mask applied to foreground pixels; and varying the smoothed alpha mask values to visualize the activity.

In another embodiment of the invention, a system or apparatus for visualizing an activity corresponding to an event in a video stream, wherein visualizing an activity comprises: a) one or more processors capable of specifying one or more sets of parameters; capable of transferring the one or more sets of parameters to a source code; capable of compiling the source code into a series of tasks for visualizing an event in a video stream; and b) a machine readable medium including operations stored thereon that when processed by one or more processors cause a system to perform the steps of specifying one or more sets of parameters; transferring one or more sets of parameters to a source code; compiling the source code into a series of tasks for visualizing an event in a video stream.

In another embodiment of the invention, a machine-readable medium having instructions stored thereon to cause a system to: distinguish whether a pixel represents a foreground object or a background object; compute an alpha mask for each video frame foreground pixel and background pixel; normalize the alpha values for each pixel throughout each frame of the video stream; smooth the alpha mask applied to foreground pixels; and vary the smoothed alpha mask values to visualize the activity in a video stream.

What is claimed is:

1. A computer implemented method of, on a computer system having one or more processors and memory storing programs executed by the one or more processors, visualizing an activity represented in a video segment by manipulating a sequence of video frames from the video segment comprising the steps of:
   (a) classifying a plurality of pixels in the sequence of video frames as representing a foreground object or a background object;
   (b) assigning one or more alpha values for each classified pixel in each video frame, based at least in part on the classification of the classified pixel;
   (c) manipulating the plurality of alpha values in order to emphasize one or more of the pixels classified as representing a foreground object; and
   (d) applying the plurality of alpha values to each pixel to visualize the activity in the video segment within a single still image.

2. The method of claim 1, where the video frames are part of the video stream and step (a) further comprises the steps of selecting an optimal sampling rate to select the plurality of video frames and thereby classify the plurality of pixels as representing a foreground object or a background object.

3. The method of claim 2, where in step (a) the foreground pixels and the background pixels are classified by determining if there is change above a threshold opacity in a pixel between the plurality of video frames at the selected sampling rate.

4. The method of claim 2, where in step (a) the foreground pixels and the background pixels are classified by setting a threshold luminance to determine if there is change above a threshold opacity in a pixel between the plurality of video frames at the selected sample rate.

5. The method of claim 4, wherein the threshold luminance is between:
   about 4%; and
   about 6%.

6. The method of claim 2, wherein the optimal sampling rate is selected from the group consisting of a fixed sampling rate and a variable sampling rate.

7. The method of claim 2, wherein the sampling rate is between:
   about 0.5 frames per second; and
   about 2 frames per second.

8. The method of claim 1, where in step (b) an alpha value is computed for foreground object pixels and a separate alpha value is computed for background pixels.

9. A computer implemented method of, on a computer system having one or more processors and memory storing programs executed by the one or more processors, visualizing an activity corresponding to an event in one or more frames comprising the steps of:
   (a) classifying a plurality of pixels in the plurality of frames as representing a foreground object or a background object;
   (b) assigning one or more alpha values for each classified pixel in each frame;
   (c) manipulating the plurality of alpha values by applying one or more of the functions selected from the group consisting of accumulating an average weighted by the alpha value for each pixel across a specified number of frames, normalizing the alpha values for each pixel in each frame of the video stream and smoothing the alpha mask applied to each pixel; and
   (d) applying the plurality of alpha values to each pixel to visualize the activity.

10. The method of claim 9, wherein the function of smoothing the alpha value involves applying a separate smoothed alpha value to foreground pixels.

11. The method of claim 10, wherein to emphasize an activity or region within a sample, the smoothed alpha value variations are selected from the group consisting of variation across the sample and variation within the sample.

12. The method of claim 10, where in step (c) foreground pixels are tinted with a translucent color; whereby the color can be varied over time to indicate temporal order.

13. The method of claim 10, where in step (c) background pixels are tinted with a translucent color; whereby the color applied to the background pixel can be varied based on a distance of the pixel from a nearest pixel that was ever part of the foreground.

14. The method of claim 10, where in step (c) a saturation of the background pixels towards grayscale is reduced by mixing their color with a luminance of their color; whereby a mixing color applied to the background pixel can be varied based on a distance of the pixel from a nearest pixel that was ever part of the foreground.

15. The method of claim 10, wherein a colored halo is drawn around a shape created by the foreground pixels.

16. The method of claim 1, where in step (b) the alpha value opacity is increased.

17. The method of claim 9, further comprising:
   (e) generating one or more keyframes of one or more events in the video stream;
wherein the keyframes further comprise an alpha blend of objects from different times to visualize the activity.

18. The method of claim 17, wherein the keyframes further comprise showing object trajectories.

19. The method of claim 17, wherein a user can highlight a shape and track of a position of one or more interesting features in the video by clicking on one or more shapes in a single video frame or in a keyframe.

20. The method of claim 17, wherein a color and/or transparency of different objects can be altered to emphasize activity.

21. The method of claim 17, wherein a trajectory of different objects are highlighted in separate keyframes.

22. The method of claim 17, wherein an activity observed in one keyframe is used to identify an object; wherein the object is further identified in other keyframes based on time.

23. A machine readable storage medium including a computer program of instructions executable by a computer to visualize an activity represented in a video segment by manipulating a sequence of video frames from the video segment, the instructions including instructions for:

(a) classifying a plurality of pixels in the sequence of video frames as representing a foreground object or a background object;

(b) assigning one or more alpha values for each classified pixel in each video frame, based at least in part on the classification of the classified pixel;

(c) manipulating the plurality of alpha values in order to emphasize one or more of the pixels classified as representing a foreground object; and (d) applying the plurality of alpha values to each pixel to visualize the activity in the video segment within a single still image.

24. A system or apparatus for visualizing an activity represented in a video segment by manipulating a sequence of video frames from the video segment, comprising:

memory one or more processors; and one or more modules stored in the memory and executed by the one or more processors, the one or more modules including instructions to:

(a) classify a plurality of pixels in the sequence of video frames as representing a foreground objects or a background object;

(b) assign one or more alpha values for each classified pixel in each video frame, based at least in part on the classification of the classified pixel;

(c) manipulate the plurality of alpha values in order to emphasize one or more of the pixels classified as representing a foreground object; and (d) apply the plurality of alpha values to each pixel to visualize the activity in the video segment within a single still image.

25. A machine readable storage medium including a computer program of instructions executable by a computer to visualize an activity corresponding to an event in one or more frames, the instructions including instructions for:

(a) classifying a plurality of pixels in the plurality of frames as representing a foreground object or a background object;

(b) assigning one or more alpha values for each classified pixel in each frame;

(c) manipulating the plurality of alpha values by applying one or more of the functions selected from the group consisting of accumulating an average weighted by the alpha value for each pixel across a specified number of frames, normalizing the alpha values for each pixel in each frame of the video stream and smoothing the alpha mask applied to each pixel; and (d) applying the plurality of alpha values to each pixel to visualize the activity.

26. A system or apparatus for visualizing an activity corresponding to an event in one or more frames, comprising:

memory one or more processors; and one or more modules stored in the memory and executed by the one or more processors, the one or more modules including instructions to:

(a) classify a plurality of pixels in the plurality of frames as representing a foreground object or a background object;

(b) assign one or more alpha values for each classified pixel in each frame;

(c) manipulate the plurality of alpha values by applying one or more of the functions selected from the group consisting of accumulating an average weighted by the alpha value for each pixel across a specified number of frames, normalizing the alpha values for each pixel in each frame of the video stream and smoothing the alpha mask applied to each pixel; and (d) apply the plurality of alpha values to each pixel to visualize the activity.

* * * * *

UNITED STATES PATENT AND TRADEMARK OFFICE
CERTIFICATE OF CORRECTION

| | | |
|---|---|---|
| PATENT NO. | : 7,623,677 B2 | Page 1 of 1 |
| APPLICATION NO. | : 11/324355 | |
| DATED | : November 24, 2009 | |
| INVENTOR(S) | : Girgensohn et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 997 days.

Signed and Sealed this

Twenty-sixth Day of October, 2010

David J. Kappos
*Director of the United States Patent and Trademark Office*